United States Patent

Xu et al.

[11] Patent Number: 6,141,437
[45] Date of Patent: *Oct. 31, 2000

[54] CAD METHOD, COMPUTER AND STORAGE MEDIUM FOR AUTOMATED DETECTION OF LUNG NODULES IN DIGITAL CHEST IMAGES

[75] Inventors: Xin-Wei Xu, Chicago; Kunio Doi, Willowbrook, both of Ill.

[73] Assignee: Arch Development Corporation, Chicago, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/562,087

[22] Filed: Nov. 22, 1995

[51] Int. Cl.[7] ............................................... G06K 9/80
[52] U.S. Cl. ..................... 382/130; 382/132; 382/172; 382/203; 128/922; 128/925
[58] Field of Search ................. 128/653.1, 924, 128/922, 925; 250/390.02; 378/901; 382/128, 130, 132, 168, 169, 170, 171, 172, 203, 256; 395/21; 364/413.13, 413.23; 600/408

[56] References Cited

U.S. PATENT DOCUMENTS

| | | | |
|---|---|---|---|
| 4,907,156 | 3/1990 | Doi et al. | 382/132 |
| 5,289,374 | 2/1994 | Doi et al. | 382/132 |
| 5,343,390 | 8/1994 | Doi et al. | 382/132 |
| 5,491,627 | 2/1996 | Zhang et al. | 600/408 |
| 5,602,935 | 2/1997 | Yoshida et al. | 382/132 |
| 5,915,036 | 6/1999 | Grunkin et al. | 382/132 |
| 5,931,795 | 8/1999 | Manly et al. | 600/587 |

OTHER PUBLICATIONS

Matsumoto et al. "Potential Usefulness of Computerized Nodule Detection in Screening Programs for Lung Cancer." Investigative Radiology, vol. 27, No. 6, pp. 471–475, Jun. 1992.

Matsumoto et al. "Image Feature Analysis of False–Positive Diagnoses Produced by Automated Detection of Lung Nodules." Investigative Radiology, vo.27, No. 8, pp. 587–597, Aug. 1992.

Wu et al. "Reduction of False Positives in Computerized Detection of Lung Nodules in Chest Radiographs Using Artificial Neural Networks, Discriminant Analysis, and a Rule–Based Scheme." Journal of Digital Imaging, vol. 7, No. 4, pp. 196–207, Nov. 1994.

Primary Examiner—Jon Chang
Attorney, Agent, or Firm—Oblon, Spivak, McClelland, Maier & Neustadt, P.C.

[57] ABSTRACT

A computer-aided diagnosis (CAD) method for the automated detection of lung nodules in a digital chest image, a computer programmed to implement the method, and a storage medium which stores a program for implementing the method, wherein nodule candidates are first automatically selected by thresholding the difference image and then classified in six groups. A large number of false positives are eliminated by adaptive rule-based tests applied to the original chest image and in the difference image and an artificial neural network (ANN) applied to remaining candidate nodule locations in the original chest image. Using two hundred PA chest radiographs, 100 normal and 100 abnormal, as the database, the presence of nodules in the 100 abnormal cases was confirmed by two experienced radiologists on the basis of CT scans or radiographic follow-up. The CAD method achieves, on average, the sensitivity of 70% at 1.7 false positives per chest image.

54 Claims, 26 Drawing Sheets

EFFECTIVE DIAMETER=2*sqrt(Ag/3.1415);
DEGREE OF CIRCULARITY=Ai/Ag;
DEGREE OF IRREGULARITY=1-(PERIMETER OF CIRCLE/PERIMETER OF ISLAND)

A perihilar nodule and its corresponding grown areas

ROI image     5     10     20     40

A perihilar non-nodule (end-on vessel) and its corresponding grown areas

ROI image     5     10     20     40

CAD METHOD, COMPUTER AND STORAGE MEDIUM FOR AUTOMATED DETECTION OF LUNG NODULES IN DIGITAL CHEST IMAGES

The present invention was made in part with U.S. Government support under grant numbers CA 24806 and CA 62625 (National Cancer Institute). The U.S. Government has certain rights in the invention.

BACKGROUND OF THE INVENTION

1. Field of the Invention

The present invention relates to computer-aided diagnosis (CAD)methods for automated detection of lung nodules in chest images and relates to U.S. Pat. Nos. 4,851,984, 4,907,156, 4,839,807, 4,918,534, 5,072,384, 5,133,020, 5,289,374, 5,319,549, 5,343,390, 5,359,513 and 5,463,345 well as pending U.S. application Ser. Nos. 08/174,175 (now U.S. Pat. No. 5,668,888), 07/915,631 (now U.S. Pat. No. 5,537,485), 08/060,531 (now U.S. Pat. No. 5,491,627), 08/235,530 (abandoned), 08/159,133 (now U.S. Pat. No. 5,638,458), 08/159,136 (abandoned), 08/158,389 (abandoned), 08/220,917 (now U.S. Pat. No. 5,881,124) and 08/428,867 (now U.S. Pat. No. 5,790,690).

2. Discussion of Background

Lung cancer is the leading cause of cancer death in men and women in the United States. It is estimated that, in 1992, there were 168,000 new cases and 146,000 deaths from this disease. The 5-year survival rate for patients with lung cancer is only about 13%. However, the 5-year survival rate can be increased to 41% if the disease is detected at a stage when nodules are small and localized. Currently, only 18% of lung cancer cases are discovered at such an early stage.

The correct detection and diagnosis of solitary, circumscribed pulmonary nodules in radiographic chest images are of great importance because many of these lesions are primary bronchogenic carcinomas, i.e., AJC (American Joint Committee on Cancer Staging) stage I lung cancers. These early primary lung cancers are often asymptomatic, but resectable. The survival rate will be improved greatly if the carcinoma is removed at this stage. Inasmuch as chest radiography is the most popular diagnostic modality for detecting lung nodules, the discovery of these nodules in a chest image is a source of major concern for patient and physician alike. Although solitary nodules discovered in radiographic surveys of the general population prove to be cancer in less than 5 per cent of cases, patients referred for lung tumor resection have a malignant nodule in approximately 40 per cent of cases. This percentage may be more than 50% for patients above the age of 50 years.

Nevertheless, the detection and diagnosis of pulmonary nodules in chest images remain one of the most difficult tasks performed by radiologists. Radiologists may fail to detect pulmonary nodules in 30% of actually positive cases. A previous study showed that 90% of peripheral lung cancers were visible in retrospect for months or even years on previous chest radiographs. (See J. R. Muhm, et al., "Lung cancer detected during a screening program using four-month radiographs," Radiology 148, 609–615 (1983).) The reasons for these false-negative diagnoses by radiologists could be the subtlety of nodules and the camouflaging effects of the normal anatomic background structures (i.e., structured noise), lack of clinical data or failure to review previous films, and/or some other subjective factors, such as distractions, subjective and varying decision criteria, and premature discontinuation of film reading after a definite finding.

Since the miss rate of detecting lung nodules by radiologists is rather high, it is expected that radiologists' performance could be improved with help from a computer-aided diagnosis (CAD) scheme. The CAD scheme is applied automatically to digitized chest radiographs, and radiologists are alerted to potential locations of nodules in the images. In this way, the CAD scheme provides a "second opinion" and leaves the final decision to the radiologists.

Several computerized methods have been developed since the 1970s by different researchers for the automated detection of lung nodules in chest images. None of these methods, however, has been applied in clinical trials, probably because of the large number of false positives generated, ranging from five to more than 10 false positives per chest image.

SUMMARY OF THE INVENTION

Accordingly, one object of this invention is to provide a novel CAD method, based on the difference image technique, image feature analysis, and artificial neural networks, for the automated detection of lung nodules in chest images, as well a novel computer for implementing the method, and a storage medium for storing a program by which the method is implemented.

Another object of this invention is to provide a novel CAD method, for the detection of lung nodules in chest images in which the number of false positive detections is reduced without decreasing sensitivity (i.e., detection of true positives).

These and other objects are achieved according to the present invention by providing a new and improved computer-aided diagnosis method for detecting lung nodules in a digitized original chest image, including a) deriving signal-enhanced and signal-suppressed versions of the original chest image and determining the difference therebetween to produce a difference image; b) gray-level thresholding the difference image at plural predetermined gray-level % threshold levels and, at each % threshold level, subjecting those pixels having values greater than respective % threshold level to predetermined morphological tests to identify candidate nodules; c) subjecting the candidate nodules to predetermined rule-based tests based on predetermined image features applied to corresponding locations in the difference image and in the original image to eliminate from the candidate nodules false-positive nodules; and d) subjecting the candidate nodules remaining after step c) to a trained artificial neural network (ANN) to eliminate further false positive candidate nodules and identify remaining candidate nodules as true positive nodule candidates.

According to the method of the invention, step b) includes setting pixel values of pixels having values below predetermined gray-level % thresholds to a constant value for each of said predetermined gray-level % thresholds to obtain islands at each gray-level % threshold; and identifying the candidate nodules on the basis of the size and shape of the islands.

According to the method of the invention, step c) includes performing predetermined rule-based tests based on image features selected from the group consisting of gray level, morphologic, and edge gradient image features calculated at locations of candidate nodules remaining after step b) and after each test of the rule-based tests.

Preferably, the rule-based tests of step c) further include performing region growing in the original chest image at fixed gray-level intervals for each candidate nodule to derive grown areas at each location corresponding to a candidate nodule in a mediastinal region of the original chest image, and eliminating as candidate nodules those candidate nodules which correspond to grown areas below a predetermined lower limit or above a predetermined upper limit.

Preferably, further rule-based tests performed in step c) include identifying gray-level % threshold levels at discrete intervals in an upper portion of a gray-level histogram of the difference image, setting pixel values of each pixel in the difference image having a value below the % threshold levels, for each % threshold level, to a constant value to produce, at each % threshold level, island regions formed by pixels having values above each said % threshold level; determining for each island region produced in the preceding step, at each % threshold level, image features selected from the group consisting of contrast, effective diameter, degree of circularity, degree of irregularity, slope of diameter, slope of circularity, slope of irregularity, and run length, determining a transition point in a selected image feature determined in the preceding determining step as a function of said % threshold levels, and eliminating as candidate nodules those candidate nodules which exhibit transition points of the image features at a % threshold level below a predetermined lower limit and above a predetermined upper limit.

Preferably, further rule-based tests performed in step c) include determining a run length in terms of the number of consecutive % threshold levels between an initial % threshold level and the transition point determined for each candidate nodule, and eliminating as candidate nodules those candidate nodules having run length below a predetermined lower limit or above a predetermined upper limit. Step c) then further includes determining the change in the image features over the respective run lengths determined in the preceding step to derive rates of change in the image features of the candidate nodules, and eliminating as candidate nodules those candidate nodules exhibiting rates of change in said image features below a predetermined lower limit or above a predetermined upper limit.

Step c) preferably further includes determining the contrast, diameter, slope of diameter, degree of circularity, degree of irregularity, slope of circularity, and slope of irregularity of each said island region in the difference image at each % threshold level, eliminating as candidate nodules those candidate nodules determined in the preceding step to have predetermined contrast, diameter, slope of diameter, degree of circularity, degree of irregularity, slope of circularity, and slope of irregularity values, performing a two-dimensional background trend correction in a region of interest of predetermined size centered on the location of each candidate nodule in the original chest image, performing region growing within a portion of the region of interest centered on the location of each candidate nodule in the original chest image at predetermined discrete gray-level increments, quantifying predetermined image features selected from the group consisting of contrast, effective diameter, degree of circularity, degree of irregularity, net contrast, slope of diameter, slope of circularity, slope of irregularity, average gradient, standard deviation of edge gradient orientation histogram at each said gray-level increment for each grown region, determining a transition point at which the effective diameter abruptly increases, eliminating as candidate nodules those candidate nodules exhibiting a predetermined contrast, effective diameter, degree of circularity, degree of irregularity, net contrast at the transition point, and eliminating as candidate nodules those candidate nodules having a slope of diameter, slope of circularity, slope of irregularity, average gradient, and standard deviation of edge gradient histogram below a predetermined lower limit or above a predetermined upper limit.

Preferably, step d) of the method of the invention includes using a three layer ANN based on a supervised error-correction learning rule, and applying to an input layer of the ANN input data based on image features including one or more image features derived from locations, in the original chest image, of candidate nodules surviving after performing step c), the one or more image features including effective diameter, degree of circularity, degree of irregularity, slope of the effective diameter, slope of degree of circularity, slope of degree of irregularity, average gradient, standard deviation of gradient orientation, contrast, net contrast, and a starting gray-level % threshold. Preferably, each image feature applied to the input layer is normalized to a range from 0 to 1 and the normalized image features are applied to said input layer as said input data.

Further, the present invention is also directed to a computer programmed to perform the steps of the method of the invention, as well as a storage medium which stores a program for implementing the method of the invention on a computer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

(d), 15% (e), and 18–27% (f) (nodules: ○; false positives: ●), where the nodule candidates are selected from 100 abnormal cases and the dotted lines demonstrate the cutoff values (rules) for eliminating the false positives in each starting % threshold level group for Test #2.

Figure 10A:
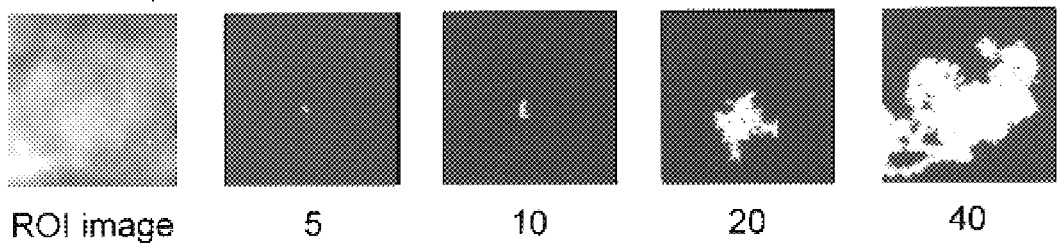
Figure 10A:
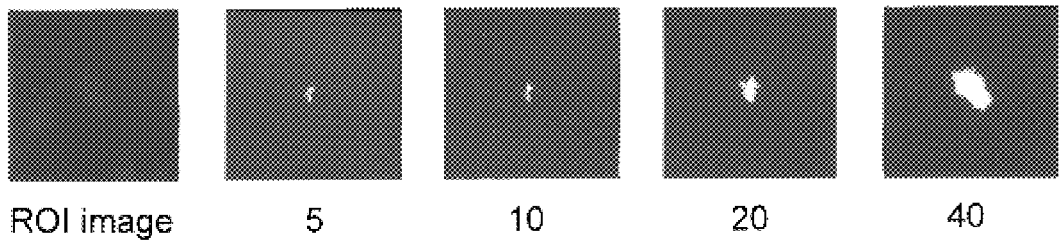
Figure 10B:
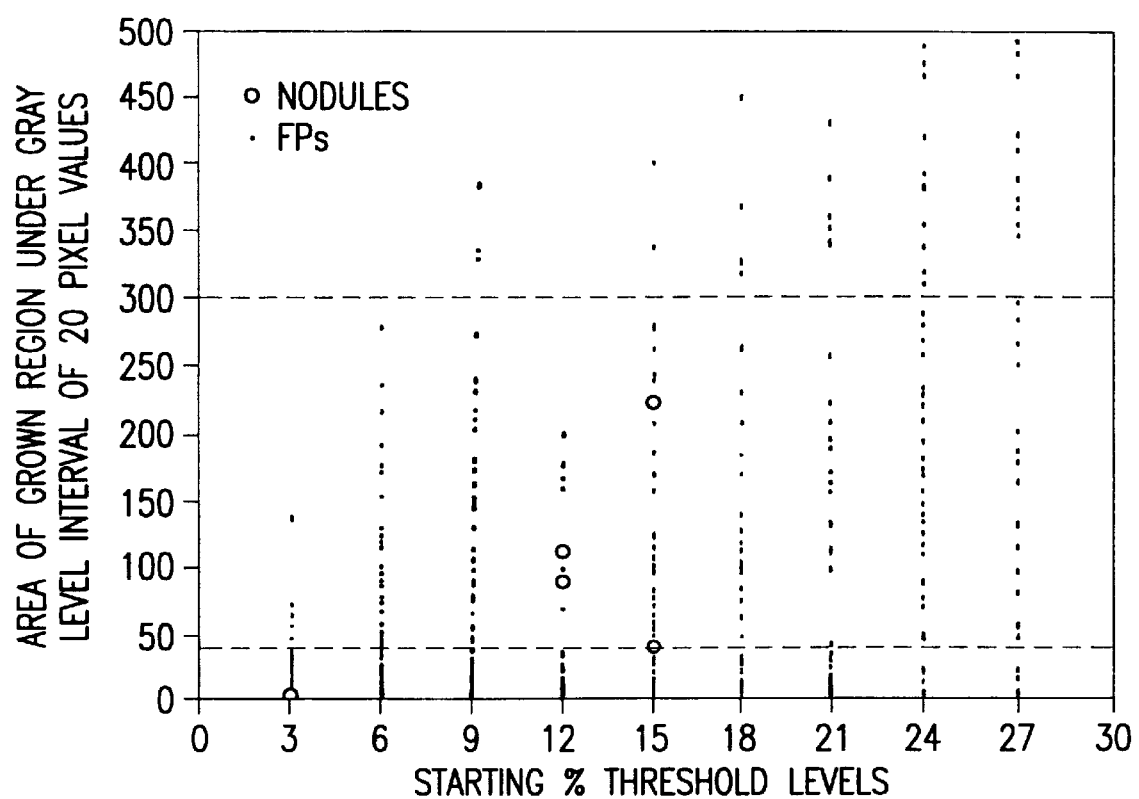

FIGS. 10(a) and 10(b) are illustrations of (a) computer generated grown areas, at a number of gray-level intervals, for a perihilar nodule and a non-nodule (false positive caused by an end-on vessel; and (b) a comparison of grown areas, at the gray-level interval of 20 pixels values, of nodule candidates in the mediastinal region (nodules: ○; FPs: ●), respectively.

Figure 11A:
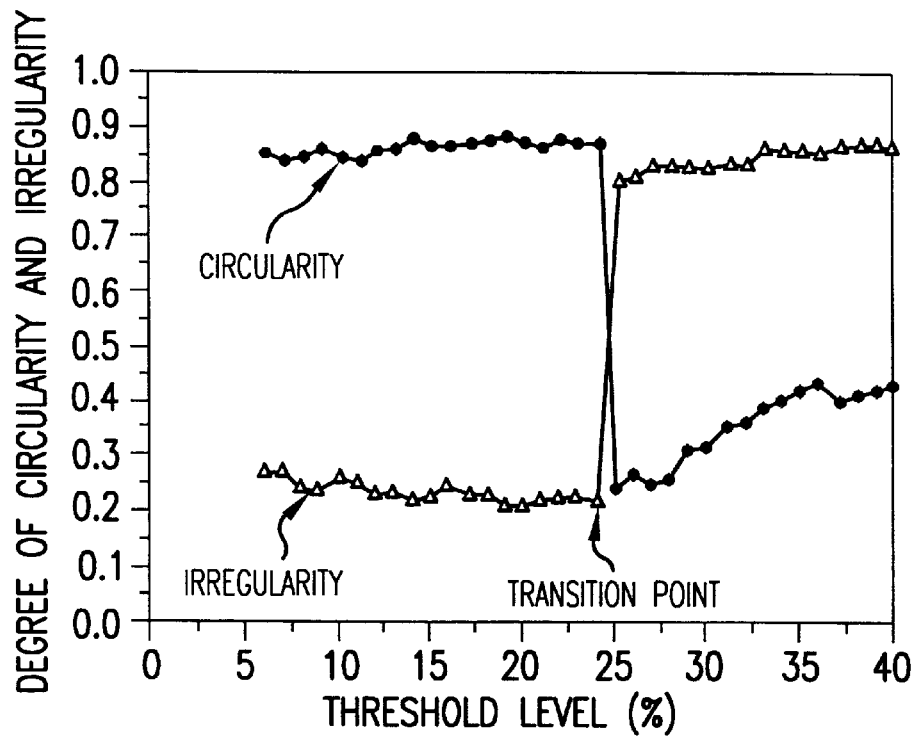
Figure 11B:
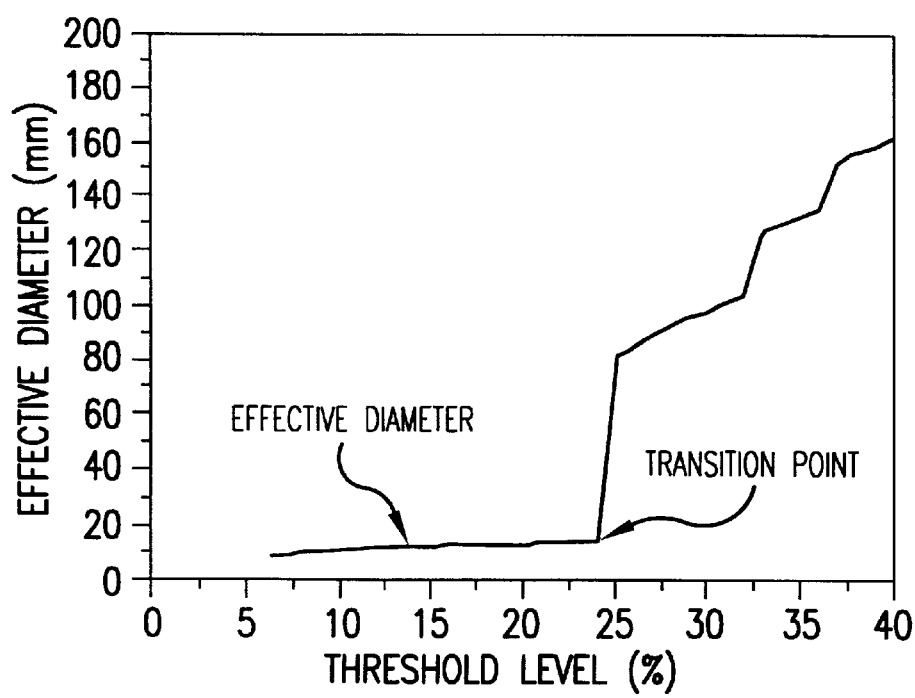
Figure 11C:
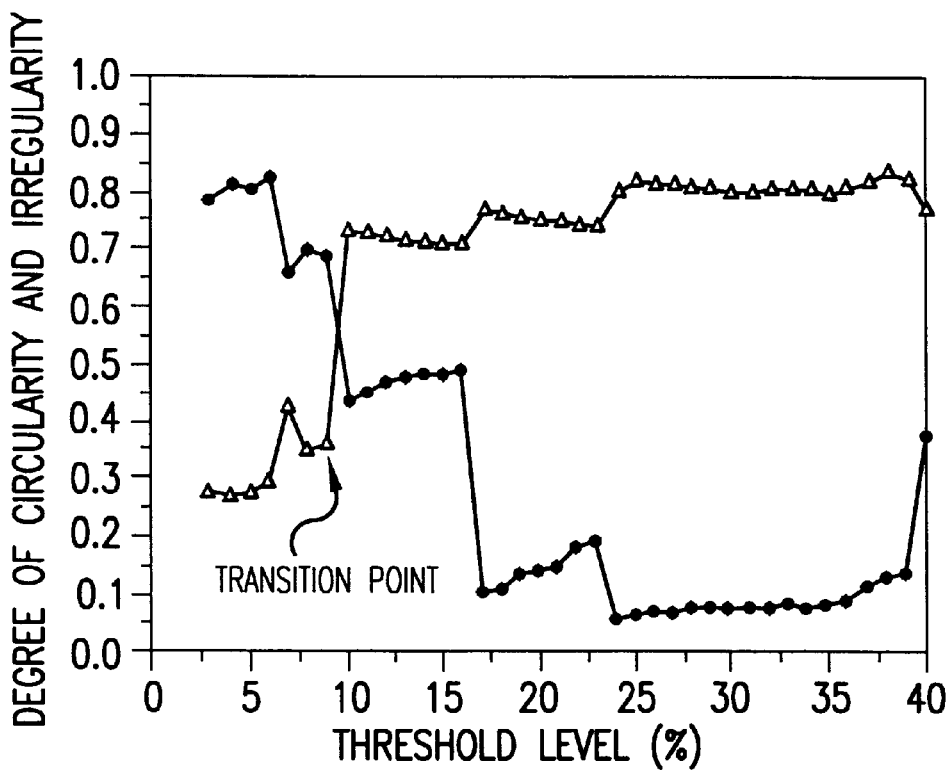
Figure 11D:
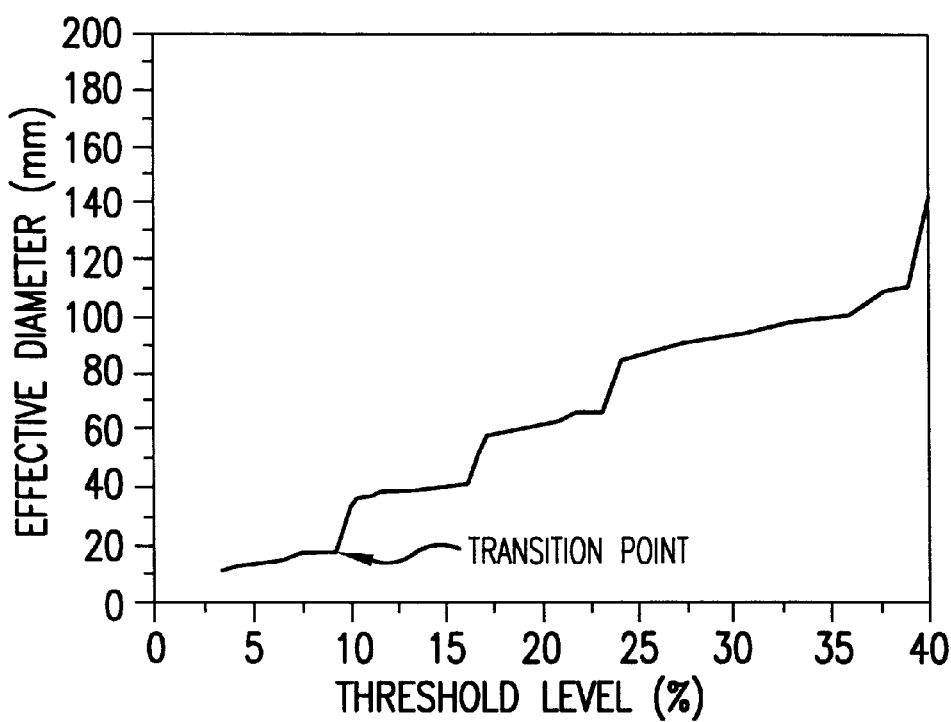

FIGS. 11(a) and 11(b) are graphs of the growth of islands corresponding to a true nodule (a) and a false positive (b), respectively. The transition point is defined at the % threshold level after which the degree of circularity is consistently below 0.5.

Figure 12A:
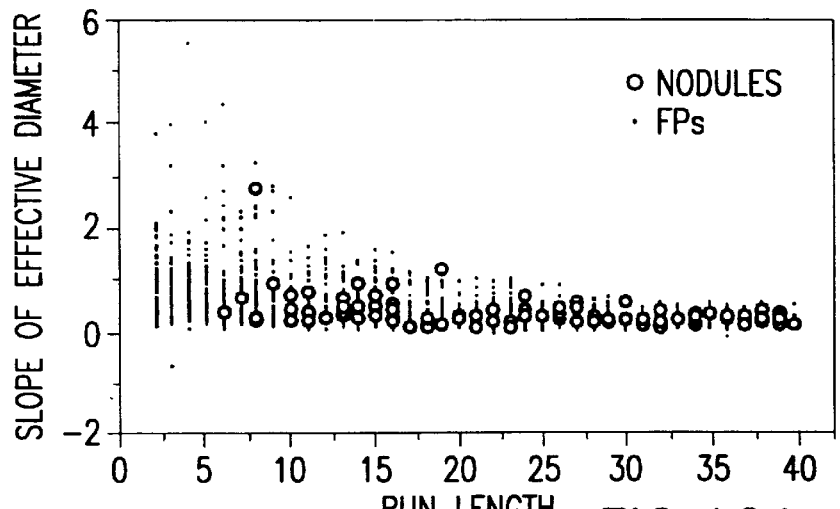
Figure 12B:
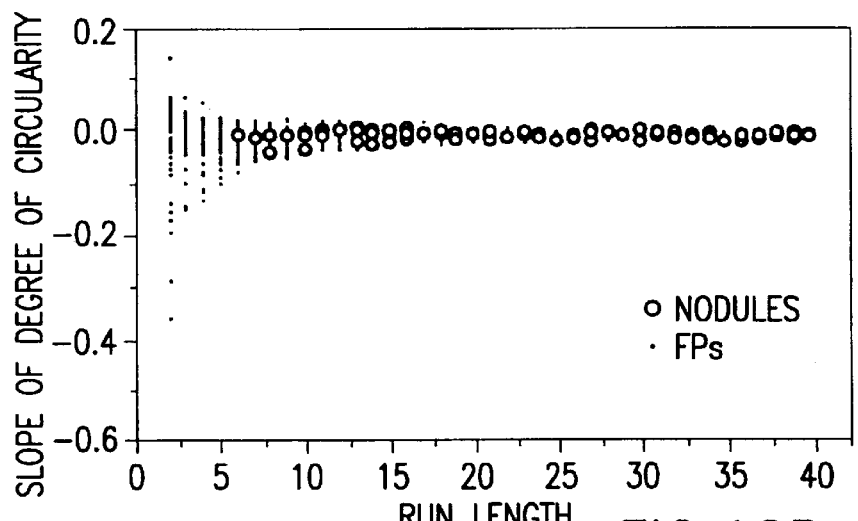
Figure 12C:
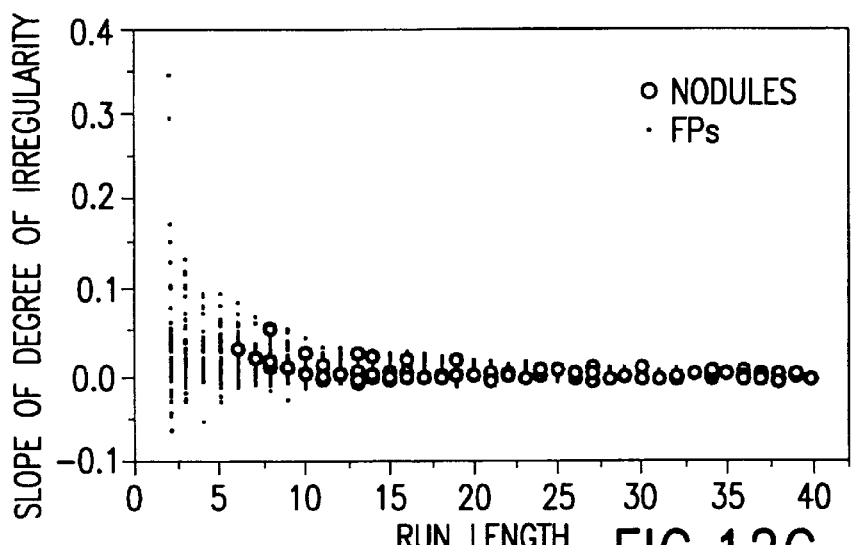
Figure 13A:
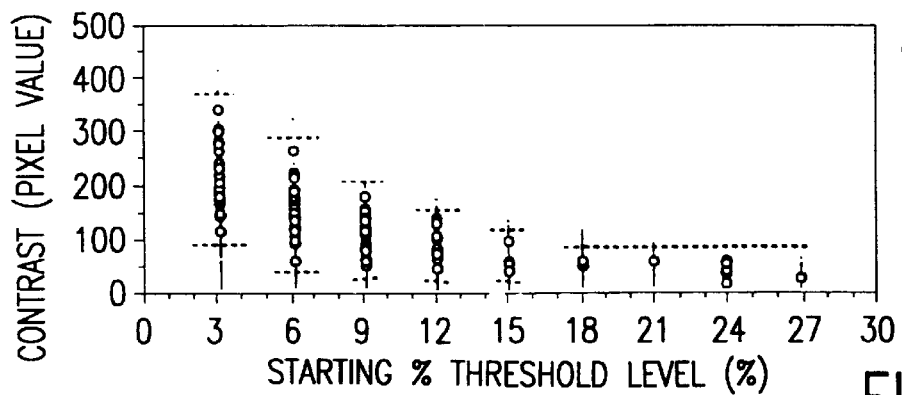
Figure 13B:
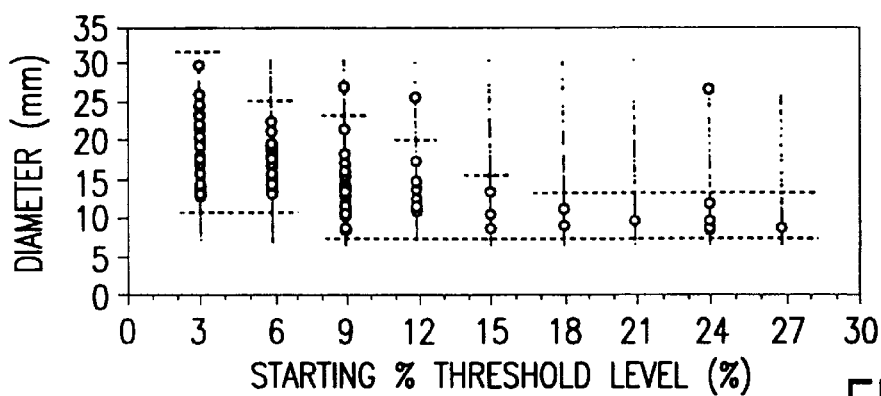
Figure 13C:
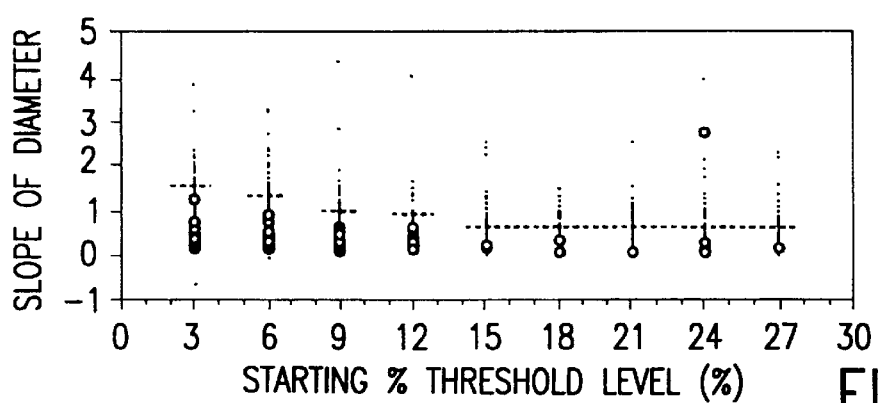
Figure 13D:
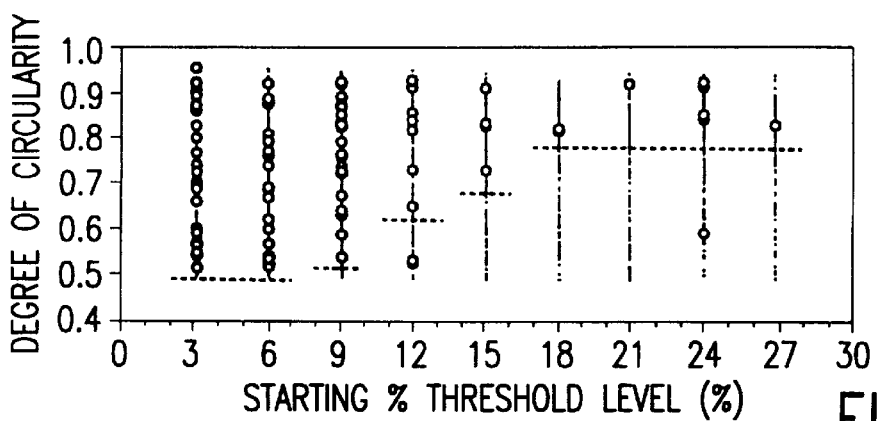

FIGS. 12(a), 12(b) and 12(c) are graphs of the relationships between the run length (RL) and the slopes of the effective diameter (a), degree of circularity (b), and degree of irregularity (c), respectively. Candidates have smaller slopes (in absolute values) when their RLs are greater.

FIGS. 13(a)–13(d) are graphs of the relationships between the starting % threshold level and some of the difference image features: (a) contrast, (b) effective diameter, (c) slope of the effective diameter, and (d) degree of circularity (nodules: ○; FPs: ●), respectively. The difference image features are derived at the transition point. The nodule candidates are taken from 100 abnormal cases and have passed all previous tests. The dotted lines demonstrate the cutoff values (rules) for elimination of the false positives in each starting % threshold level group for Test #4.

Figure 14A:
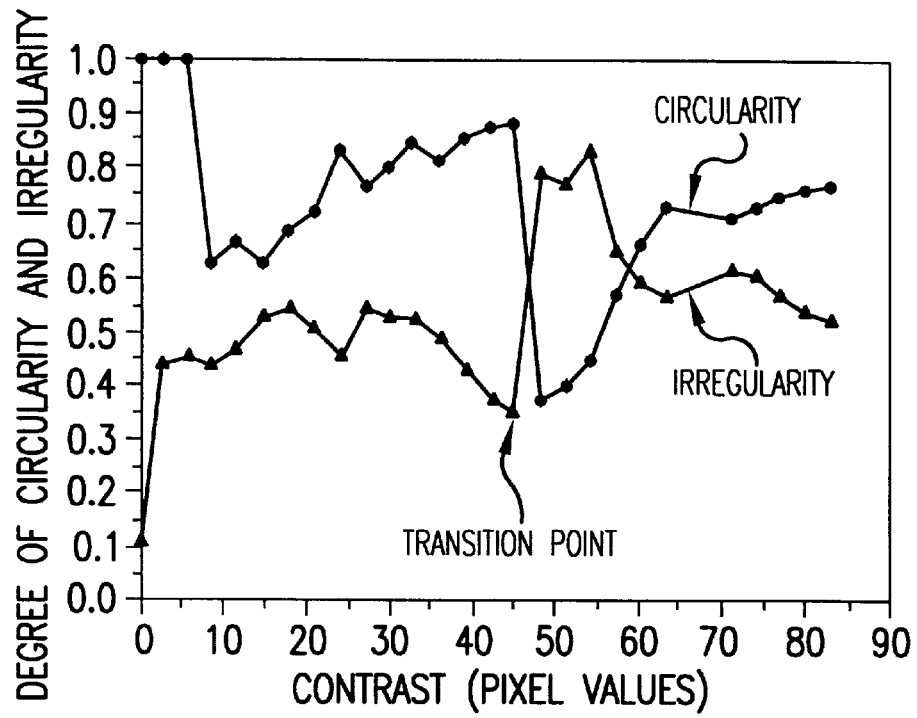
Figure 14B:
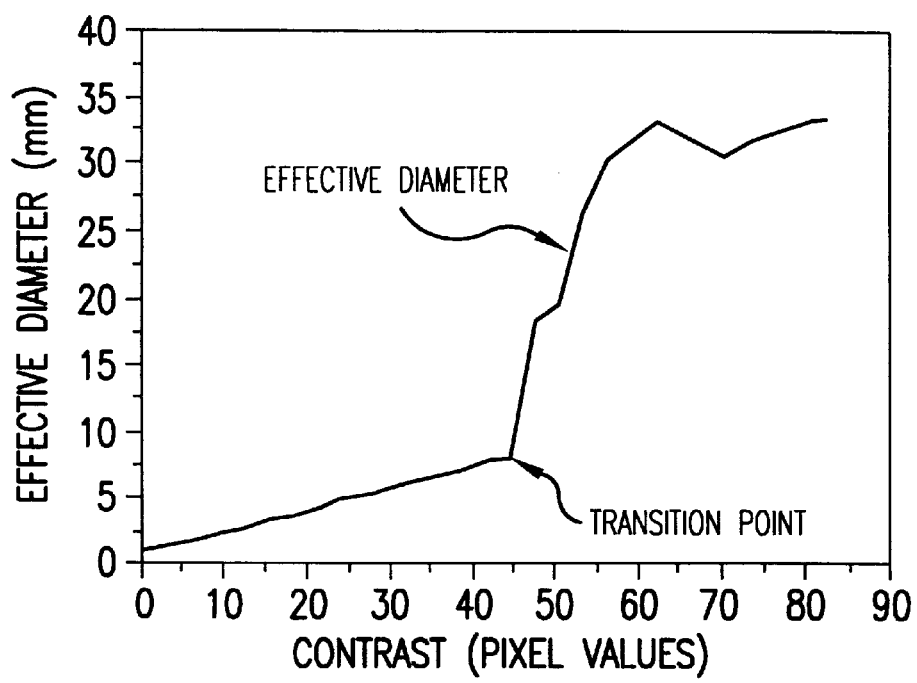
Figure 15A:
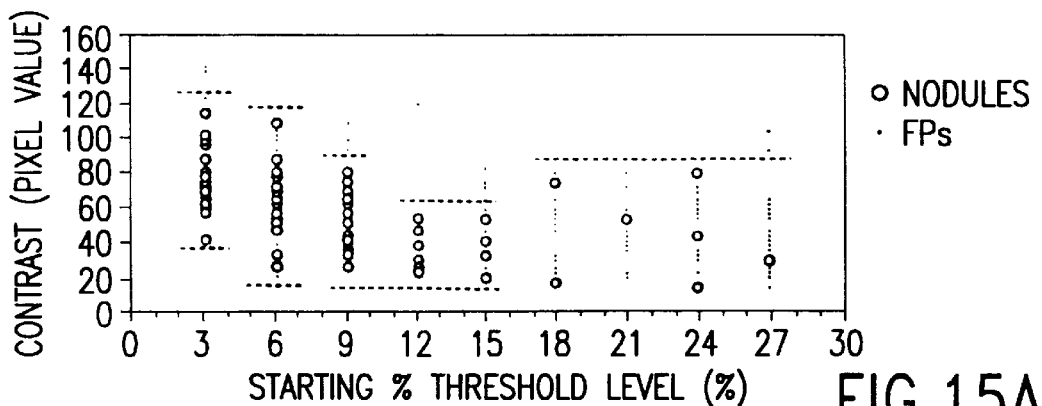
Figure 15B:
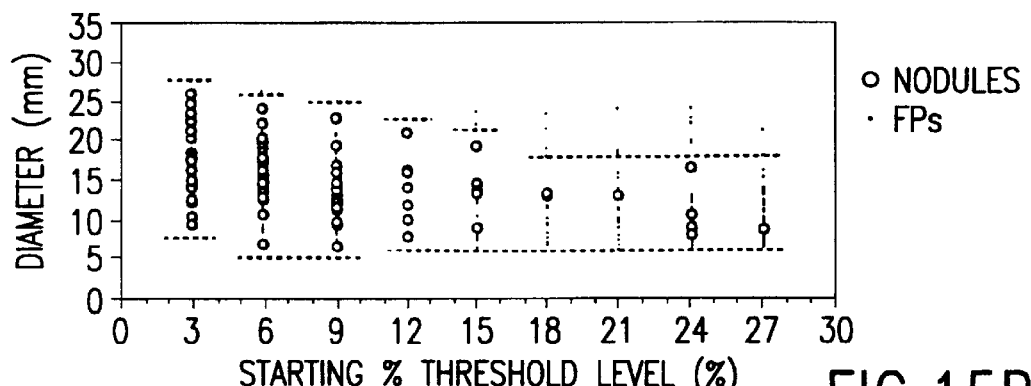
Figure 15C:
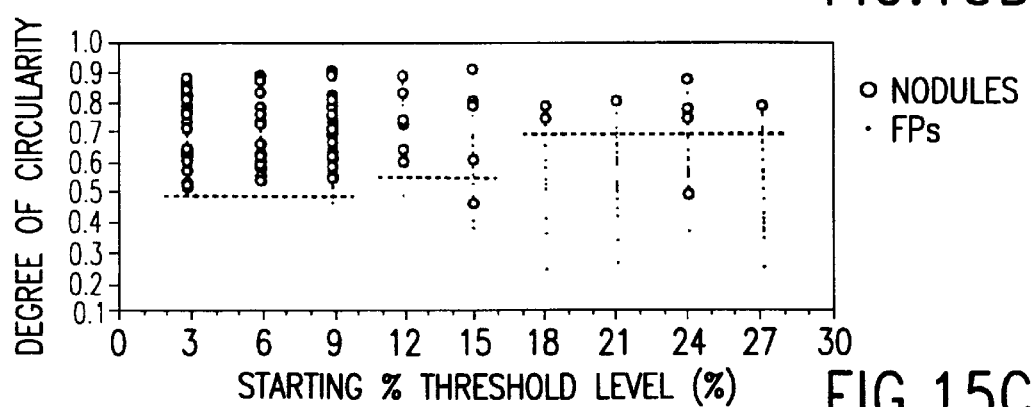
Figure 15D:
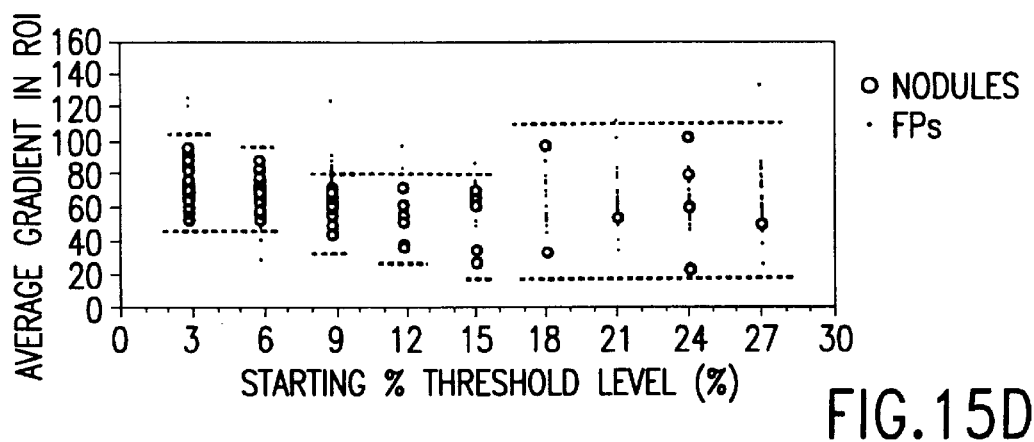

FIGS. 14(a) and 14(b) are graphs illustrating the relationships between the contrast of the grown region and its degree of circularity, degree of irregularity, and effective diameter for a true nodule. The morphologic image features are calculated from the original chest image. The transition point is determined at the contrast immediately after which the effective diameter increases abruptly.

FIGS. 15(a)–15(d) are graphs illustrating the relationships between the starting % threshold level and some of the original image features: (a) contrast, (b) effective diameter, (c) degree of circularity, and (d) average gradient for nodule candidates (nodules: ○; FPs: ●), respectively. The original image features such as the contrast, effective diameter, and degree of circularity are calculated at the transition point. The average gradient is obtained by edge gradient analysis in the ROI. The dotted lines demonstrate the cutoff values (rules) for elimination of the false positives in each starting % threshold level group for Test #5.

Figure 16:
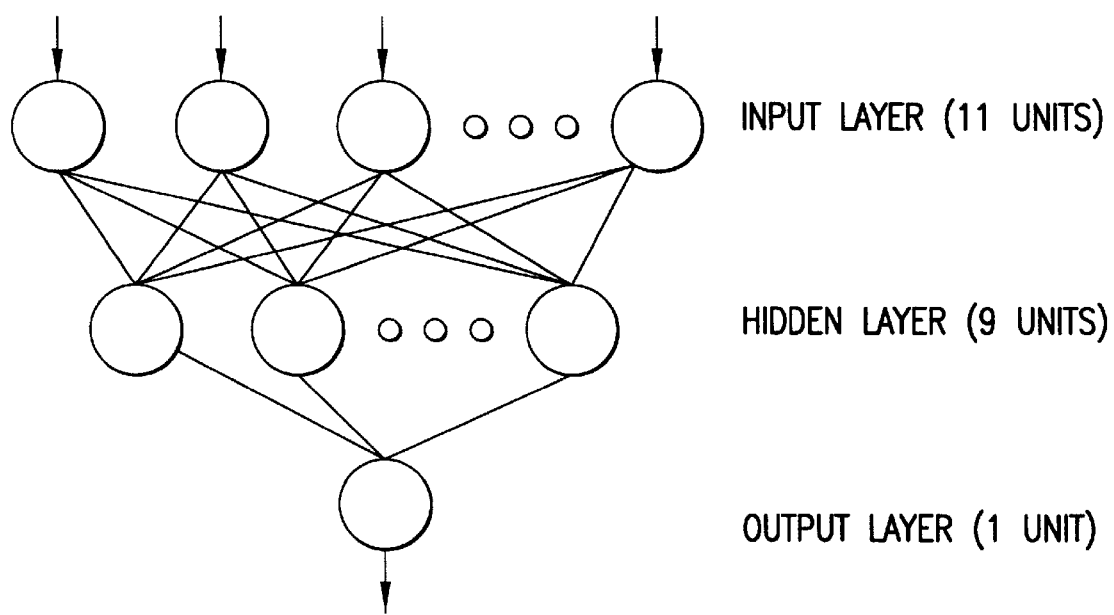

FIG. 16 is a schematic diagram of an artificial neural network (ANN) used in the CAD method of the present invention.

Figure 17:
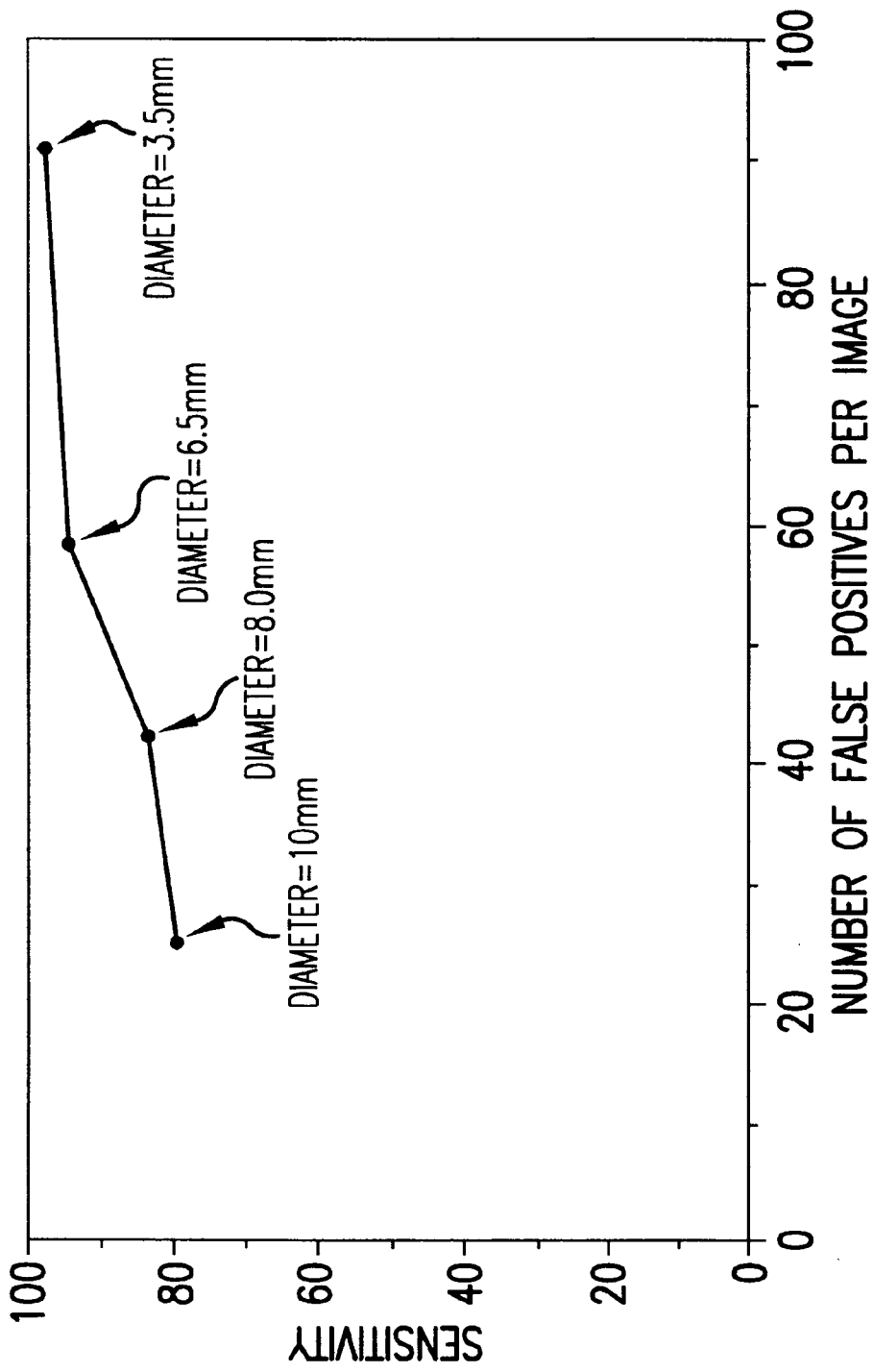

FIG. 17 is a FROC curve of Test #1, obtained by varying the rule for the effective diameter.

Figure 18:
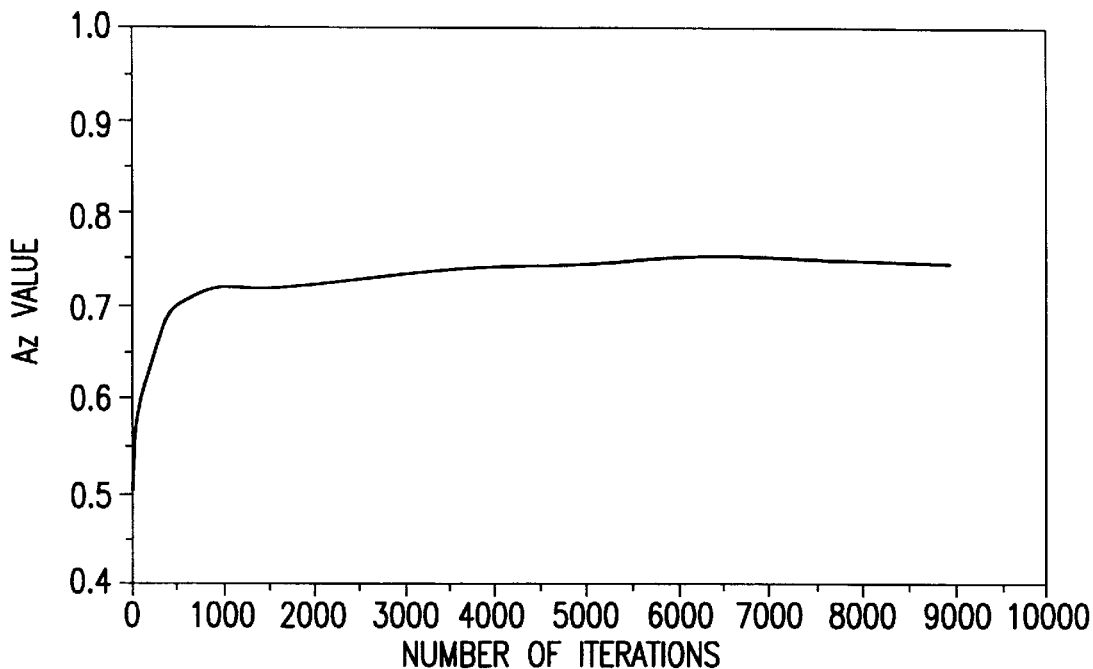

FIG. 18 is a graph illustrating the dependence of the $A_z$ value on the number of iterations used for training the ANN in our CAD scheme.

Figure 19:
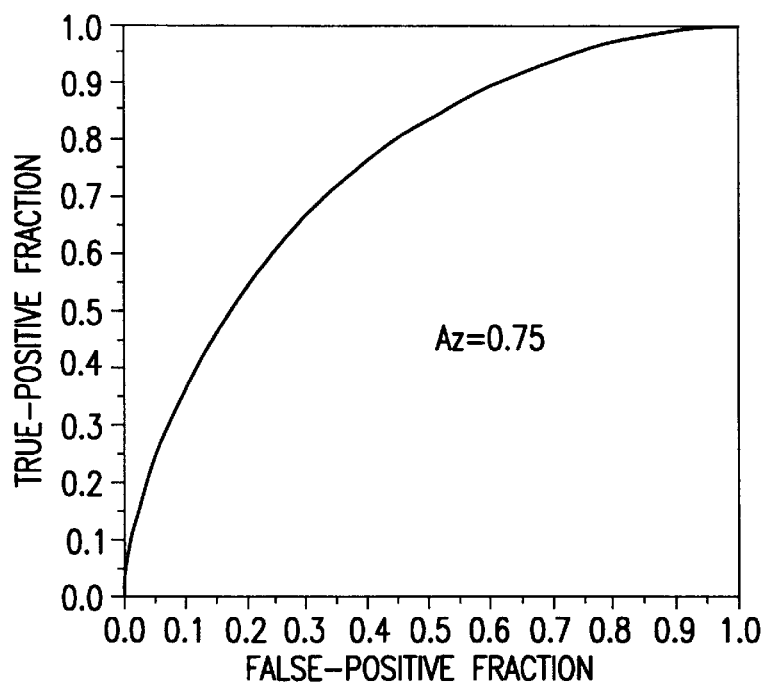

FIG. 19 is a ROC curve of the ANN in distinguishing between nodules and false positives, for nodule candidates after all of the rule-based tests have been applied.

Figure 20:
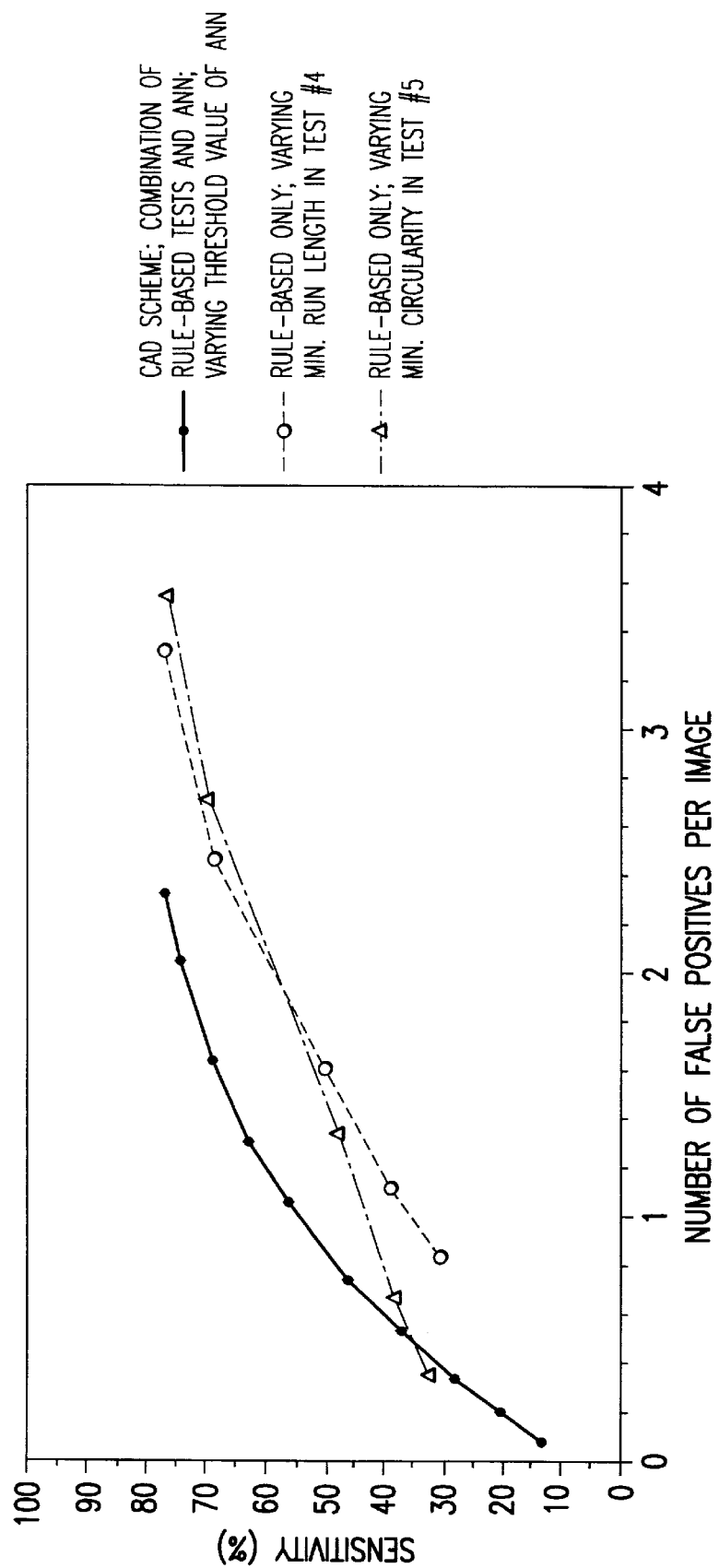

FIG. 20 is a comparison of FROC curves for CAD schemes by the rule-based tests only and the combination of rule-based tests and ANN.

Figure 21A:
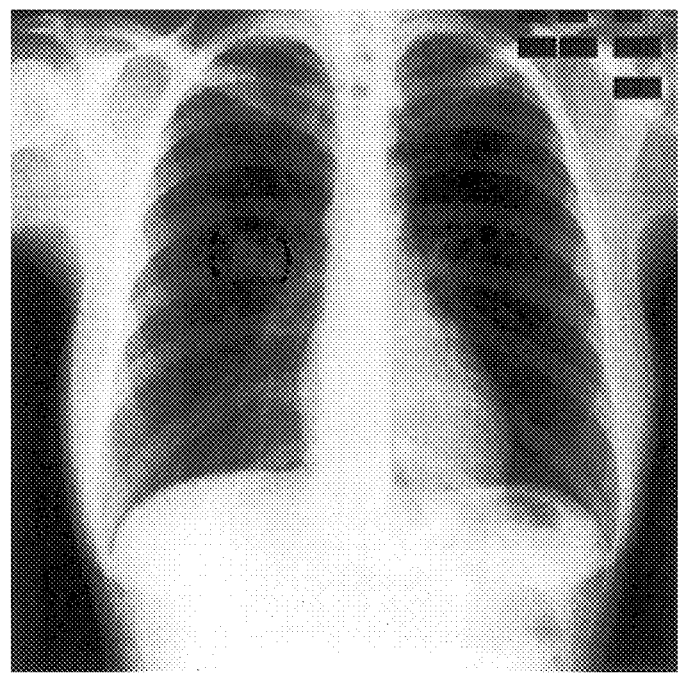
Figure 21B:
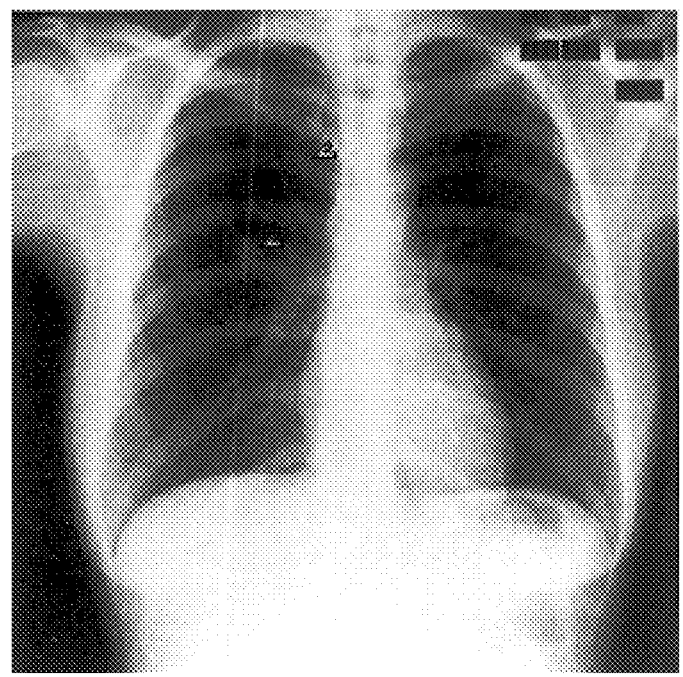

FIGS. 21(a) and 21(b) are illustrations of the computer output for a chest image, in which the original image (FIG. 21(a)) has an extremely subtle nodule (rating score 1) in the middle lobe of the right lung, indicated by parentheses, and the CAD result (FIG. 21(b)) shows the detected nodule (arrow) together with a false positive.

Figure 22:
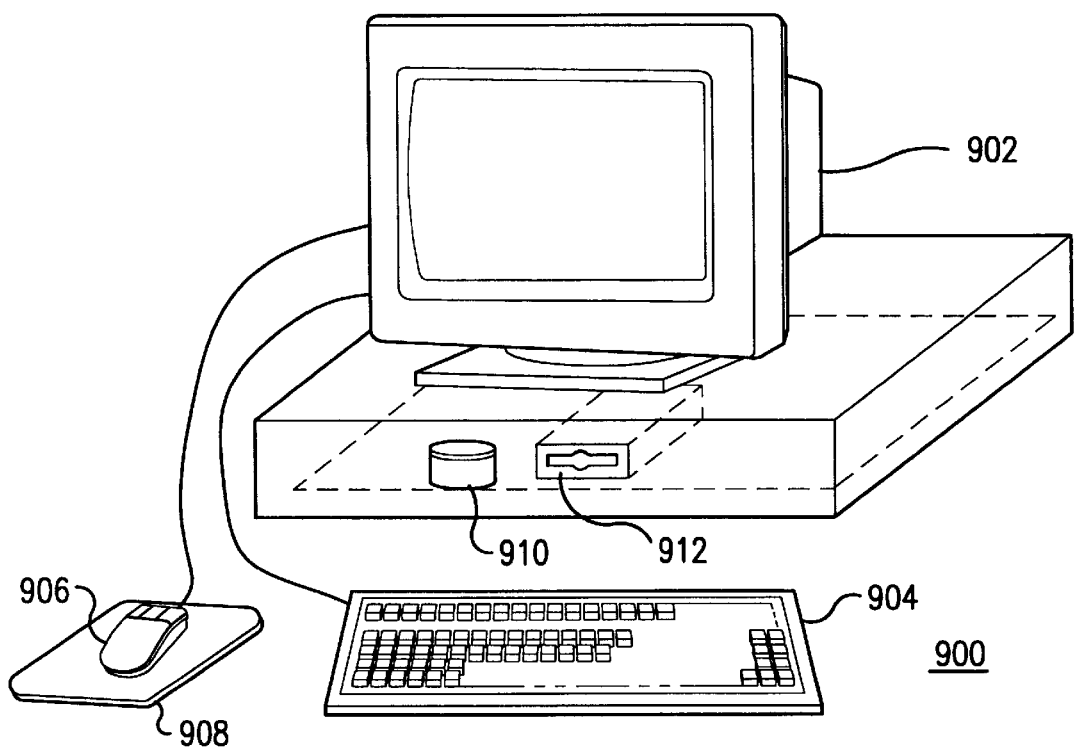

FIG. 22 is an illustration of a general purpose computer that may be programmed to perform the method according to the invention, and a storage medium storing a program to perform the method according to the invention.

DETAILED DESCRIPTION OF THE PREFERRED EMBODIMENTS

In the development of the present invention, a database was produced based on 200 postero-anterior (PA) chest radiographs, 14"×17", selected in the Department of Radiology, the University of Chicago Hospital. One hundred cases were abnormal (age range, 27–86 years; mean age, 59 years; 55 female, 45 male patients). For the 100 abnormal cases, a total of 122 nodules were confirmed based on the consensus of two experienced thoracic radiologists and verified by CT scans or radiographic follow-up. In the following discussion, a nodule is defined as a focal, intrapulmonary, non-calcified soft-tissue opacity that satisfies the following criteria: (1) size less than 30 mm, (2) round, oval, or slightly lobulated in shape, but sharply circumscribed; and (3) absence of adjacent infiltrative or consolidation disease.

The remaining 100 films were control cases (age range, 26–80 years; mean age, 49 years; 57 female, 43 male patients). All of these cases were selected based on CT findings of no lung nodules. The interval range between the chest radiographs and the corresponding CTs was two weeks or less. In these cases, however, other abnormalities were allowed, such as pleural, hilar, and mediastinal abnormalities, marked cardiomegaly, and radiopaque devices.

The location, size, and subjective subtlety of each nodule were evaluated independently by two radiologists. The subjective subtlety was determined by means of a 5-point rating scale: (1) extremely subtle, (2) very subtle, (3) subtle, (4) relatively obvious, and (5) obvious.

Figure 1A:
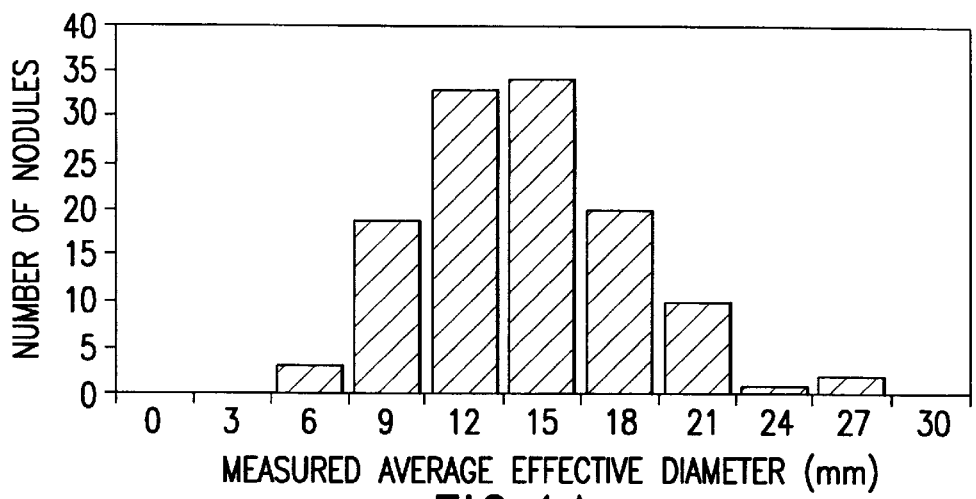
FIGS. 1(a), 1(b) and 1(c) illustrate histograms of average effective diameter (a), contrast (b), and subjective subtlety (c) of 122 nodules in the database, respectively.
Figure 1B:
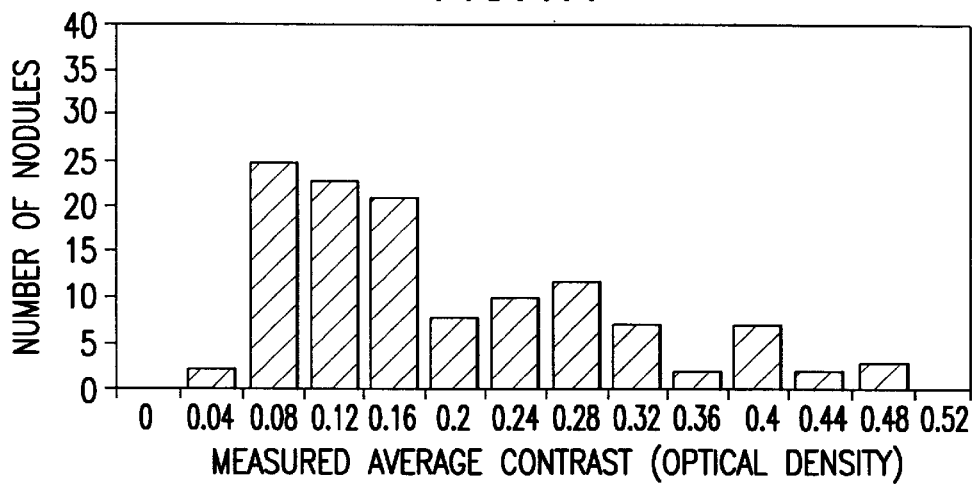
Figure 1C:
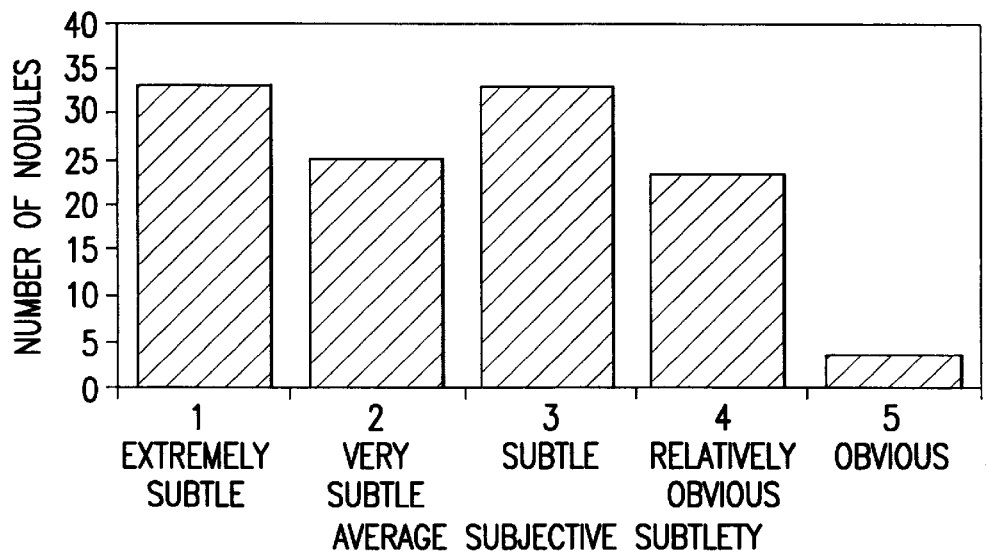
Figure 2A:
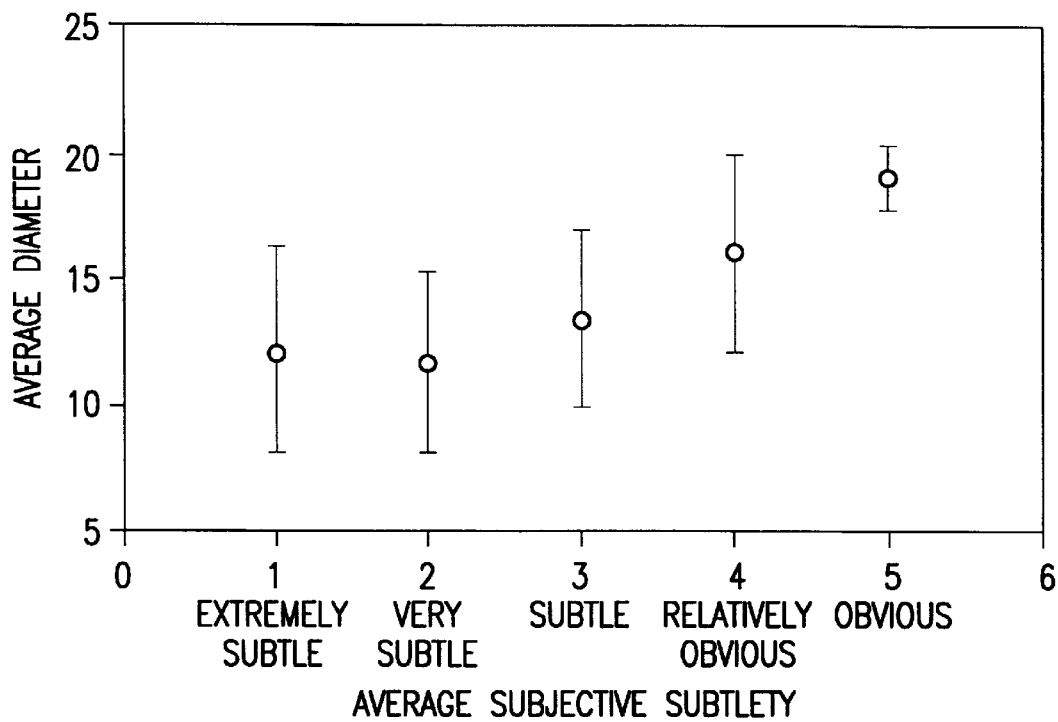
FIGS. 2(a) and 2(b) are graphs illustrating the relationship between the subjective subtlety and the average effective diameter (a) and contrast (b), averaged in each rating group, respectively.
Figure 2B:
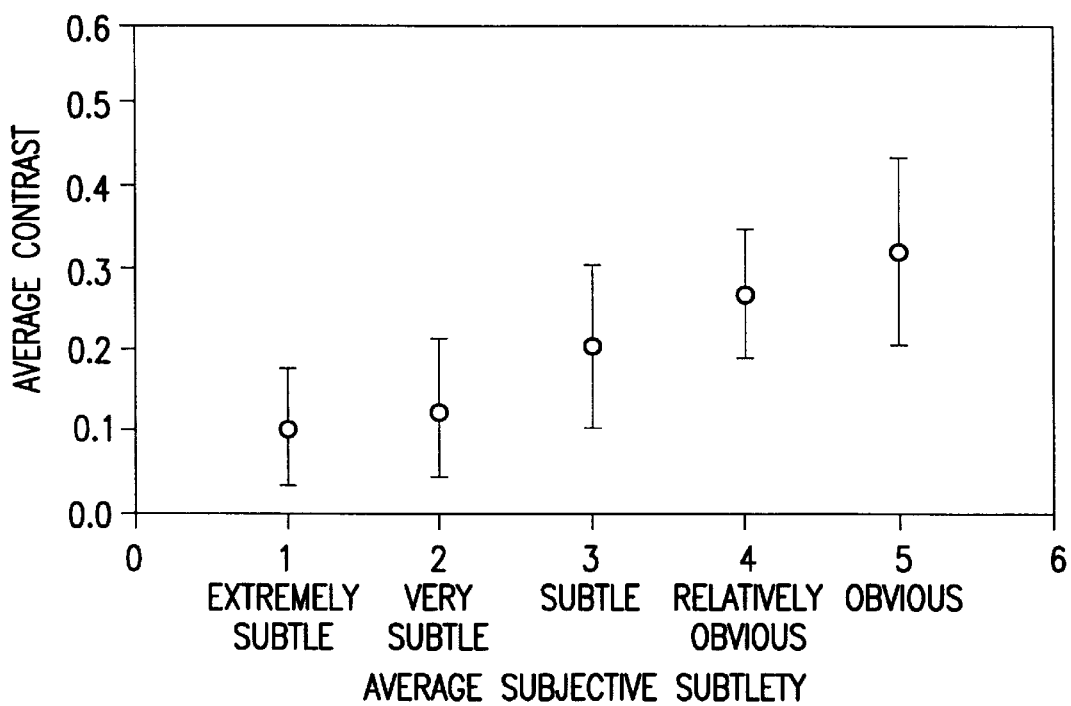

FIGS. 1a, 1b and 1c show the distributions of the nodules in the database for the measured average effective diameter (mm) and contrast (optical density), and for the subjectively determined average subtlety. The relationships between the subjective subtlety and the average effective diameter (and the average contrast), averaged in each rating group, are shown in FIGS. 2(a) and 2(b). As indicated in FIGS. 2(a) and 2(b), subtle nodules are generally of small size and low contrast. The correlation coefficients between the subjective subtlety and the average effective diameter (and the average contrast) are 0.939 and 0.989, respectively. The corresponding p-values are 0.0146 and 0.0003, respectively, at the 95% confidence level.

The digital images were obtained by digitizing the chest radiographs with a Konica laser film scanner (KDFR-S). The image matrix size in this study is 500×500, and the effective pixel size is 0.7 mm. The gray level of a digital image is 10 bits. The pixel value of the scanner is inversely proportional to the optical density of the film. Alternatively, any source of digital chest images can be used. For example, digital chest images obtained from a Fuji Computed Radiography system can be used.

A. Overall View of the CAD Method

Figure 3:
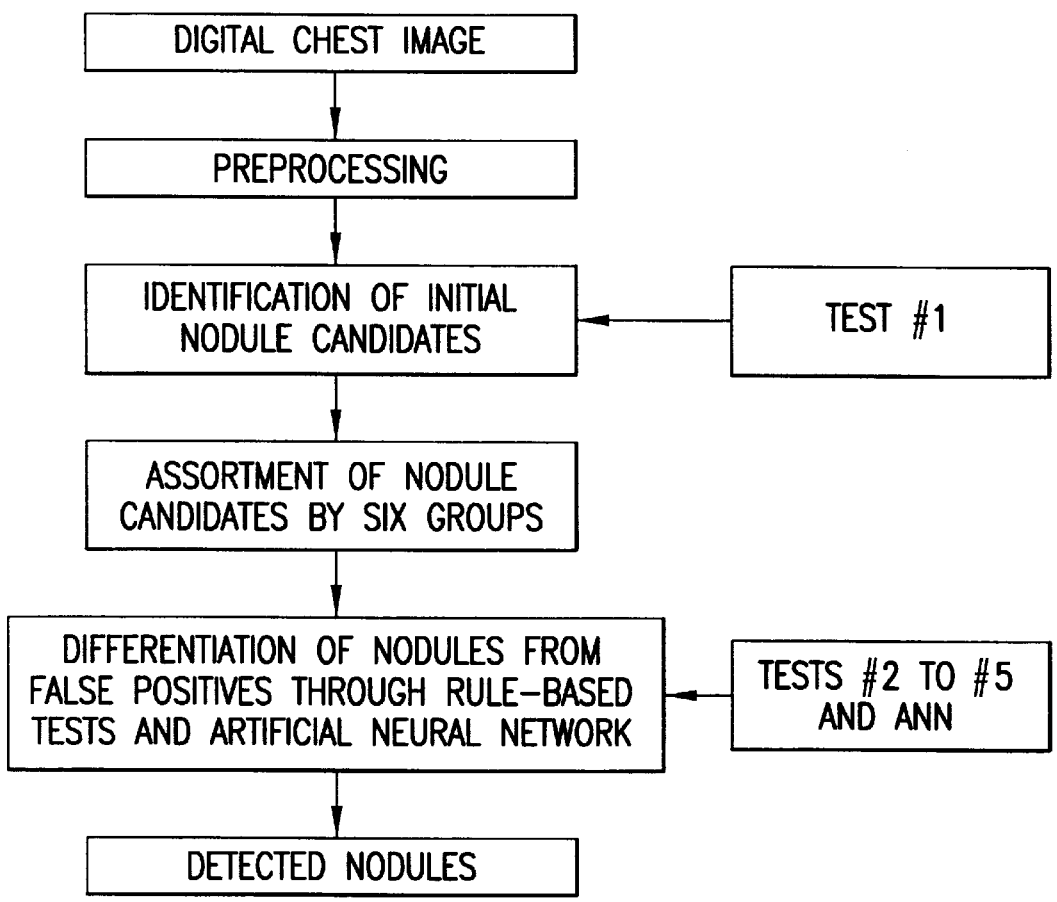
FIG. 3 is a flow chart illustrating steps in the computer-aided diagnosis (CAD) scheme for the automated detection of lung nodules in chest images.

The present CAD method for the automated detection of lung nodules in digital chest images includes four basic steps, as illustrated by the block diagram in FIG. 3. The preprocessing step includes the segmentation of lung fields and the difference image technique. With the difference image approach, the normal anatomic background structures can be simplified and the conspicuity of nodules in the original chest image can be improved. Initial nodule candidates in a chest image are selected from the difference image by multiple gray-level thresholding. These nodule candidates are then classified in six groups according to their "starting % threshold levels", i.e., the percentage threshold levels at which the nodule candidates can be identified. Next, to differentiate between nodules and non-nodules (false positives), a series of rule-based image-feature analysis tests (or rule-based tests in short) and an artificial neural network (ANN) are applied. The image features of each candidate are extracted from both the original chest image and the difference image. The various image features are derived by either region growing analysis or edge gradient analysis. The rule-based tests are conducted on candidates in each starting % threshold level group. The ANN is applied for further removal of false positives which cannot be eliminated by the rule-based tests. Finally, a candidate which has survived all of the sequential rule-based tests and the ANN is reported by the CAD scheme as a suspected nodule.

B. Preprocessing

Figure 4A:
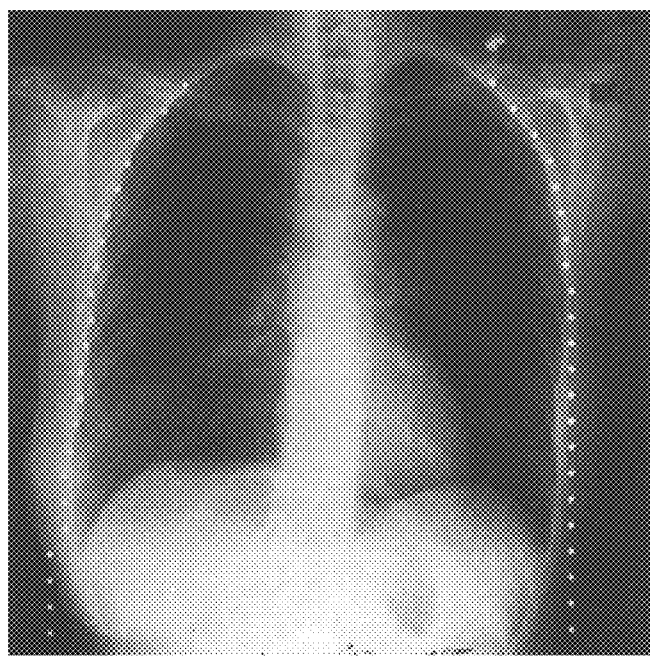
FIGS. 4(a) and 4(b) illustrate images including a chest image with the computer determined ribcage edges (a) and two regions (b), namely, the peripheral region (gray area) and the mediastinal region (light area), respectively.
Figure 4B:
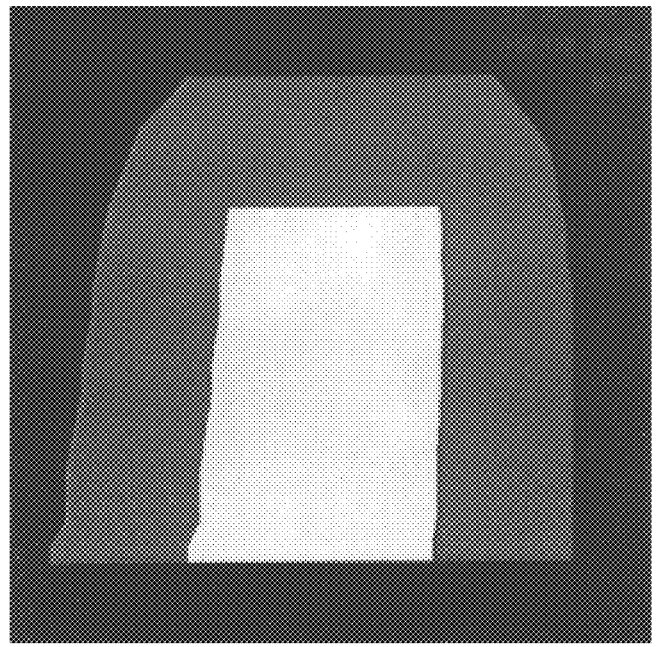

The preprocessing serves two purposes, i.e., the segmentation of lung fields in the chest image and the calculation of the difference image. Segmentation of lung fields includes the detection of ribcage edges, and the lung top and lung bottom of the chest image. The entire lung region is then divided into two portions, namely, the peripheral region and the mediastinal region. (See U.S. application Ser. No. 08/428,867.) FIGS. 4(a) and 4(b) display the computer determined ribcage edges (a) and the peripheral region and mediastinal region (b) for a chest image. The peripheral area, the gray region in FIG. 4(b), consists mainly of the peripheral lung fields. However, the mediastinal area, the light region in FIG. 4(b), includes the perihilar regions and the mediastinum. The left and right borders of the mediastinal area are determined by shifting the detected ribcage edges of the right and left lungs toward the midline by a distance equal to 25% of the distance between the midline and the corresponding ribcage edges at each vertical location. The upper limit of the mediastinal area is below the lung top by a distance equal to 45% of the lung length. The lung length is defined here as the distance between the lung top and the lung bottom in the chest image.

The main procedure of the difference image technique is the production of two filtered images from the original one, namely, a signal-enhanced image and a signal-suppressed image. The signal-enhanced image is derived by use of a matched filter with the nodule size of 9 mm, which can effectively enhance round patterns (i.e., nodule type patterns) as small as 6 mm in diameter. The signal-suppressed image results from use of a ring-shaped filter whose inside and outside diameters are 18 mm and 19.4 mm, respectively. The pixel value at the center of the ring is replaced by the average of the pixel values that lie along the ring. The difference image is then derived by subtraction of the signal-suppressed version from the signal-enhanced version. Because the backgrounds of the two filtered images are comparable, the difference between the two consists of an image with the enhanced round patterns (i.e., nodule type patterns) superimposed on a relatively simple background.

Figure 5A:
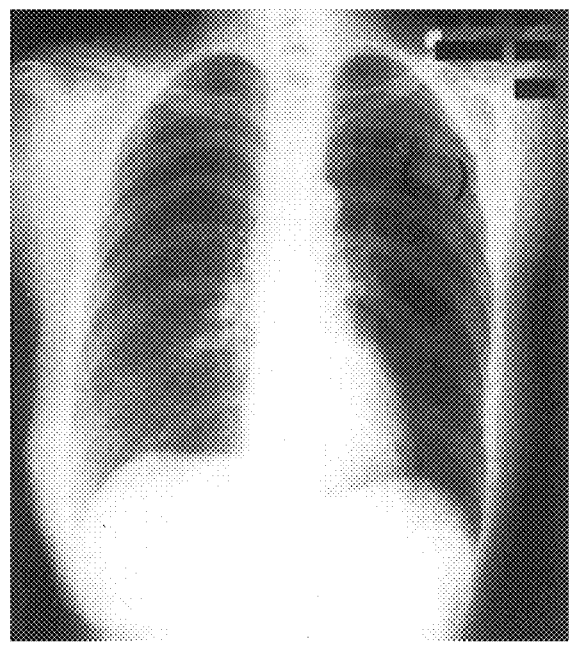
FIGS. 5(a) and 5(b) illustrate images including an original chest image (a) and its corresponding difference image (b), respectively, wherein there is a subtle nodule in the upper lobe of the left lung, which is overlapped by a posterior rib, as indicated by parentheses.
Figure 5B:
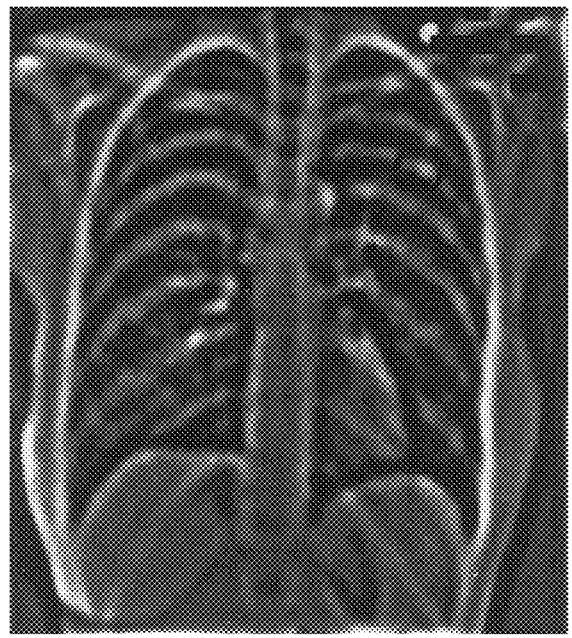

The usefulness of the difference image approach is demonstrated in FIGS. 5(a) and 5(b). The original chest image, FIG. 5(a), has a subtle nodule in the upper lobe of the left lung which is overlapped with a posterior rib, as indicated by parentheses. The appearance of this nodule is improved dramatically in the difference image, as shown in FIG. 5(b). It should be noted that some non-nodule patterns may also be enhanced in the difference image. Generally, these non-nodule patterns are mainly due to rib- or vessel-related crossings, or to round shape devices.

C. Selection and Assortment of Initial Nodule Candidates

Figure 6A:
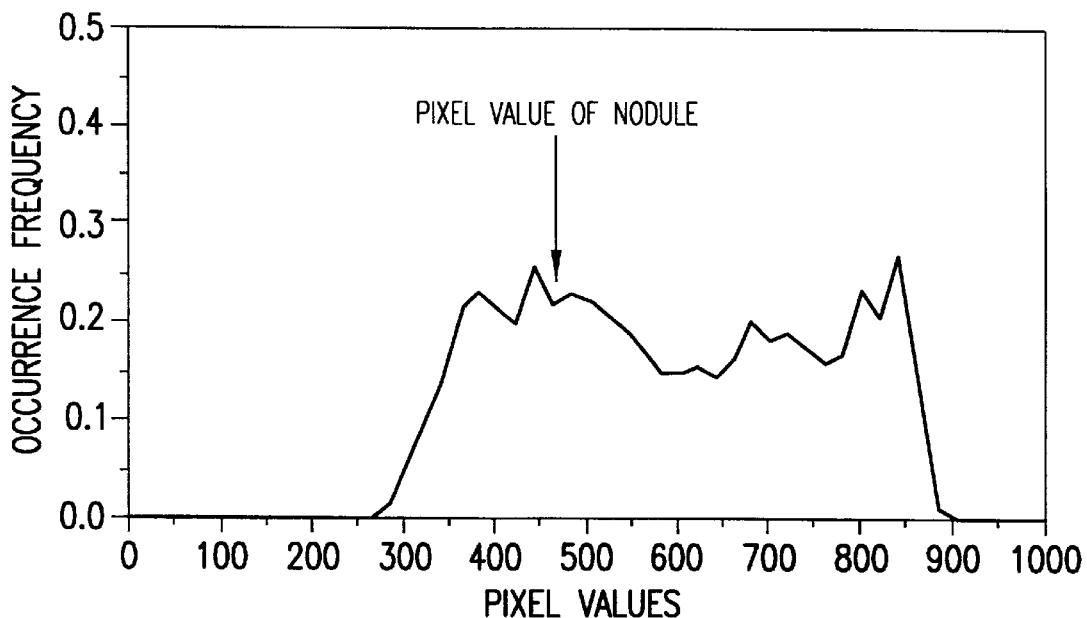
FIGS. 6(a) and 6(b) illustrate histograms of the original chest image (a) and difference image (b) in FIGS. 5(a) and 5(b), respectively, wherein the histograms are calculated from the areas within the ribcage edges.
Figure 6B:
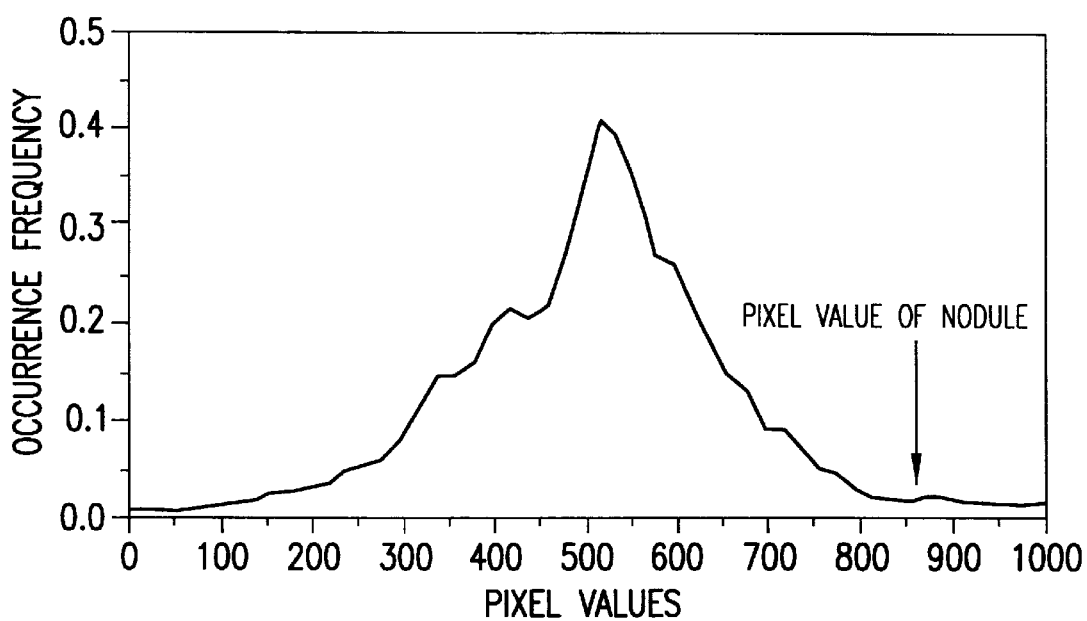
Figure 7A:
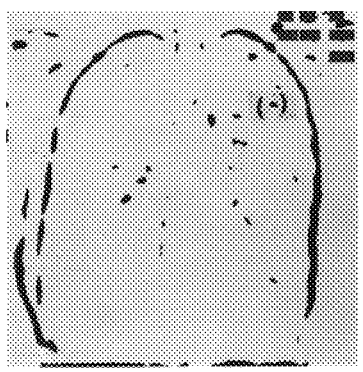
FIGS. 7(a)–7(f) illustrate island images resulting from thresholding the difference image in FIG. 5(b), where the % threshold levels are 3% (a), 6% (b), 9% (c), 12% (d), 15% (e), and 18% (f), respectively, and the islands in a binary image of a % threshold level are the remaining patterns of the connected pixels which have pixel values equal to or above the corresponding gray-level threshold level (the island of the nodule is indicated by parentheses).
Figure 7B:
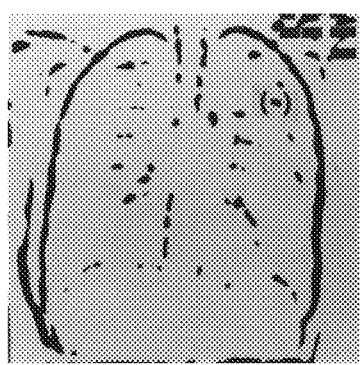
Figure 7C:
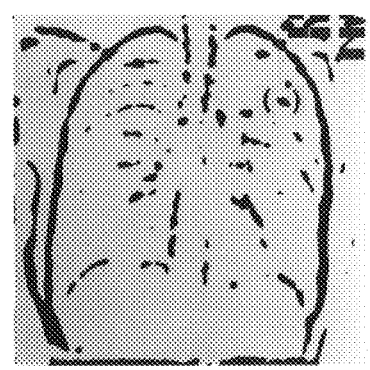
Figure 7D:
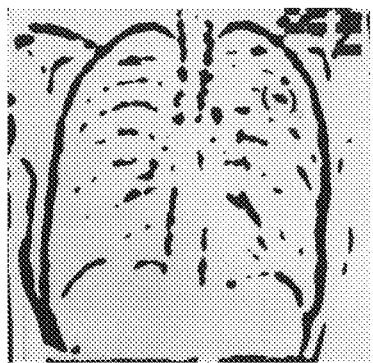
Figure 7E:
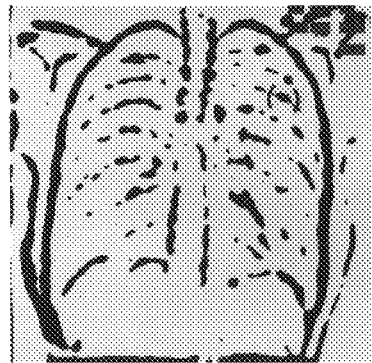
Figure 7F:
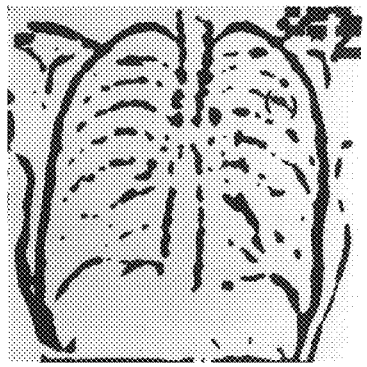

To extract the initial nodule candidates from the difference image, multiple gray-level thresholding is performed on the difference image. The cutoff pixel values (or "gray-level threshold levels") for the multiple gray-level thresholding are determined based on the gray-level histogram of the difference image that is calculated from the regions bounded by the ribcage edges. FIGS. 6(a) and 6(b) are gray-level histograms corresponding to the original chest image and to the difference image in FIGS. 5(a) and 5(b), respectively, derived from the regions within the ribcage edges. The pixel value of the nodule in each histogram is indicated by an arrow. It would be impractical to extract the nodule in the original chest image by using gray-level thresholding because the pixel value of the nodule, as indicated by the arrow in FIG. 6(a), is embedded in pixel values of other structures. In the difference image, however, the pixel value of the nodule is located at the high end of its histogram. Therefore, it is straightforward to isolate the nodules in the difference images by multiple gray-level thresholding.

The gray-level threshold level is selected so that pixel values above a given gray-level threshold level correspond to a specific upper percentage of the area under the difference image histogram. Therefore, the gray-level threshold levels can be related to these upper percentage areas (or "% threshold levels") under the difference image histogram. For example, in FIG. 6(b), the gray-level threshold levels corresponding to the upper 3% and 27% of the areas under the difference image histogram are 787 and 592, respectively. It should be noted that a large % threshold level corresponds to a low gray-level threshold level. Currently, the beginning and ending % threshold levels for the multiple gray-level threshold process are selected as 3% and 27%, respectively. The increment interval between each % threshold level is 3%.

Figure 8:
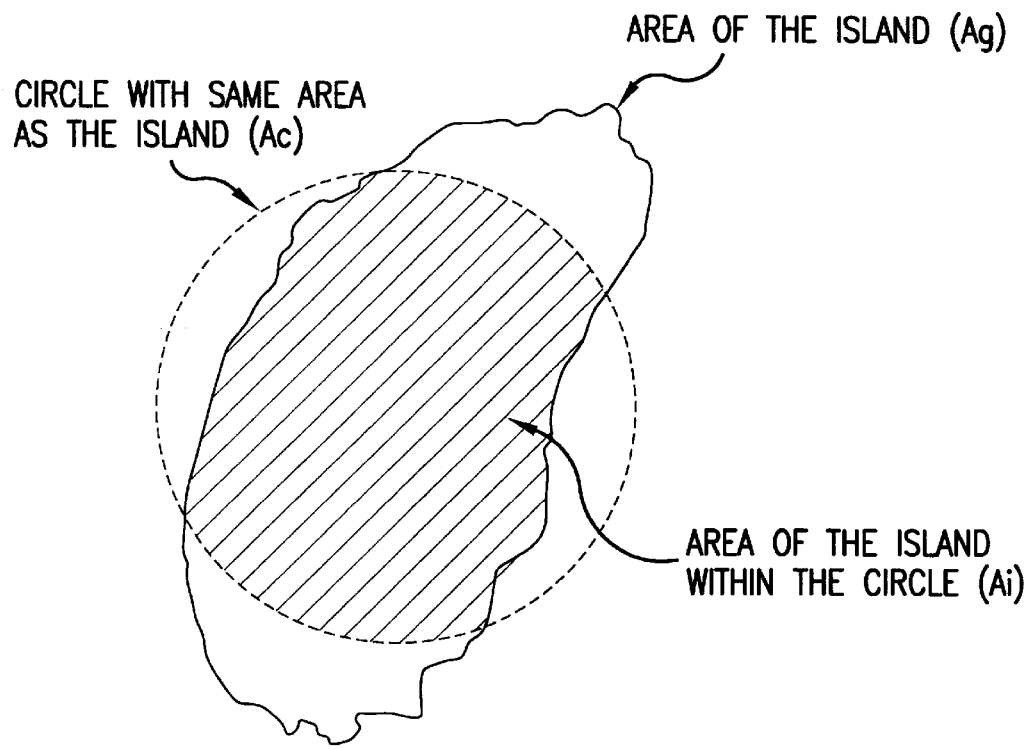
FIG. 8 illustrates definitions of the three measures for describing the size, circularity, and irregularity of an island.
Figure 9A:
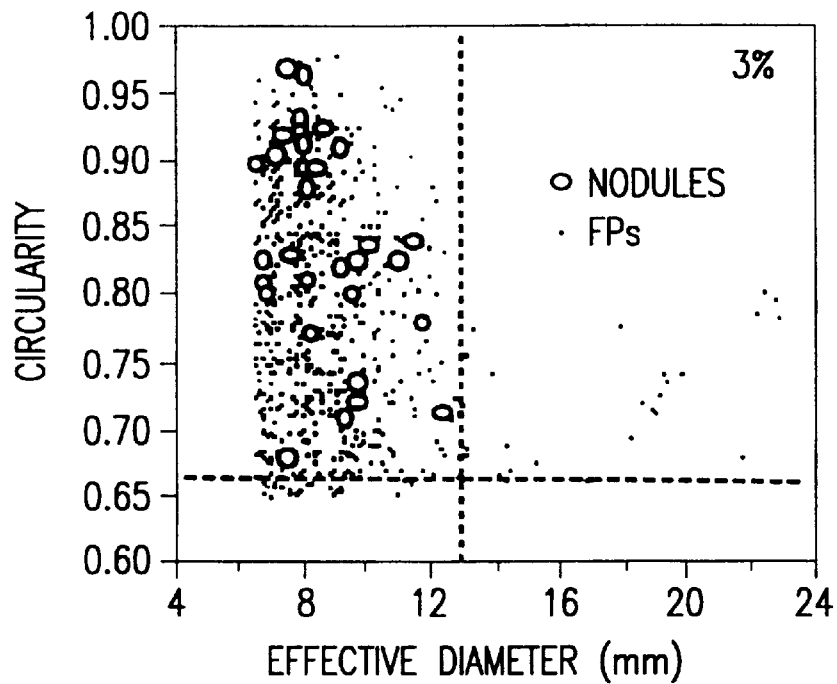
FIGS. 9(a)–9(f) illustrate relationships between effective diameter and degree of circularity for nodule candidates at starting % threshold levels of 3% (a), 6% (b), 9% (c), 12%
Figure 9B:
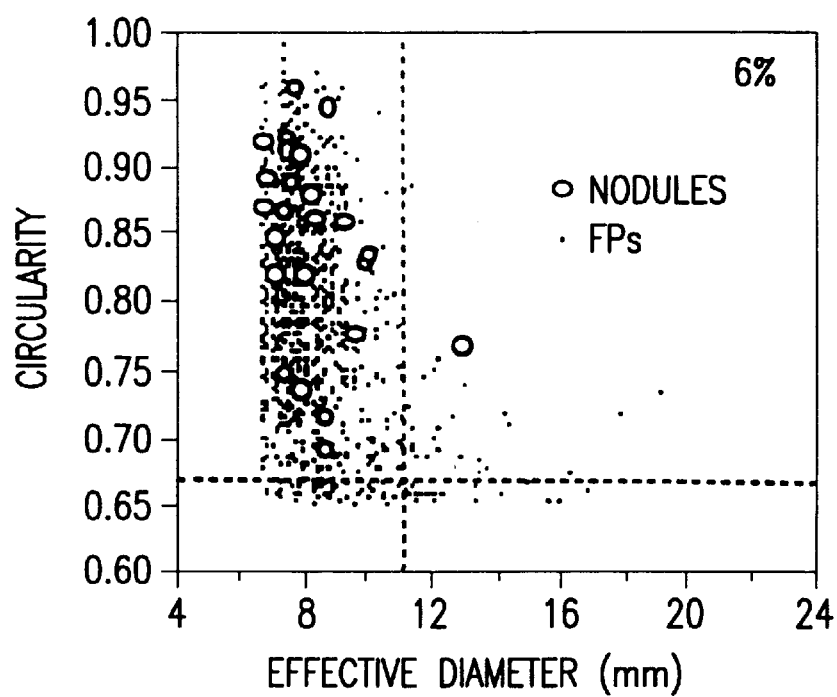
Figure 9C:
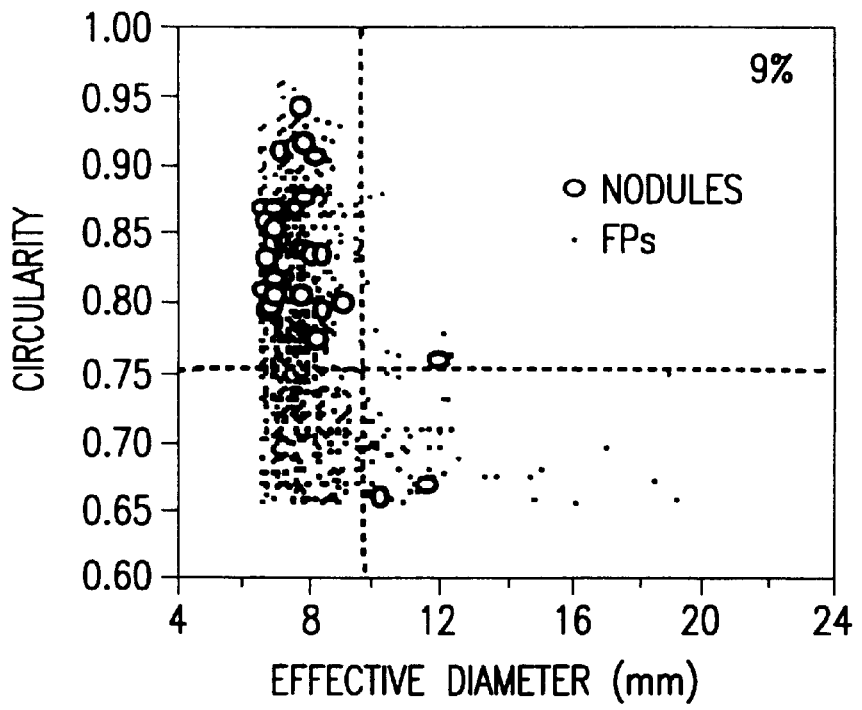
Figure 9D:
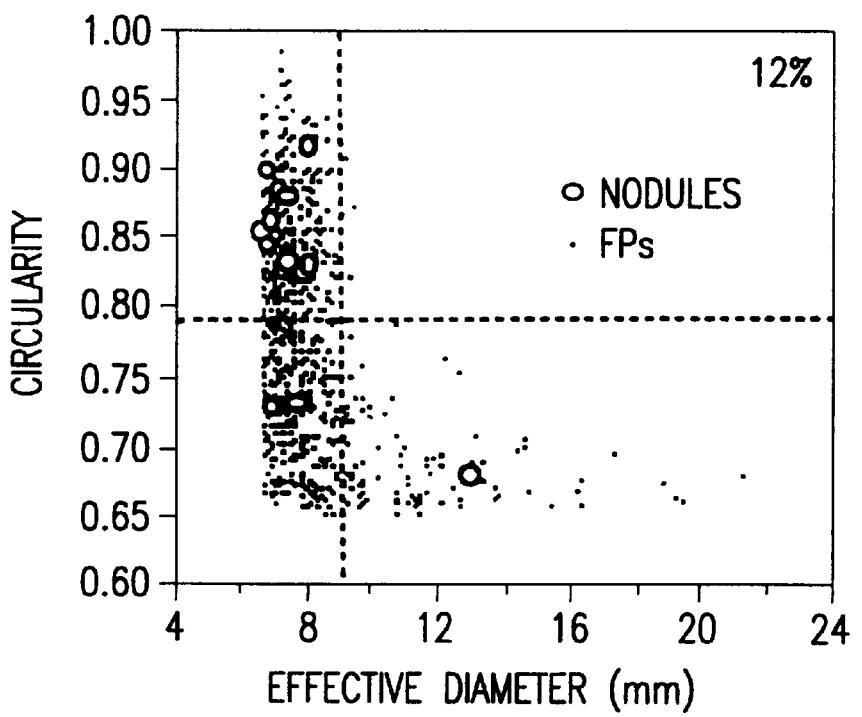
Figure 9E:
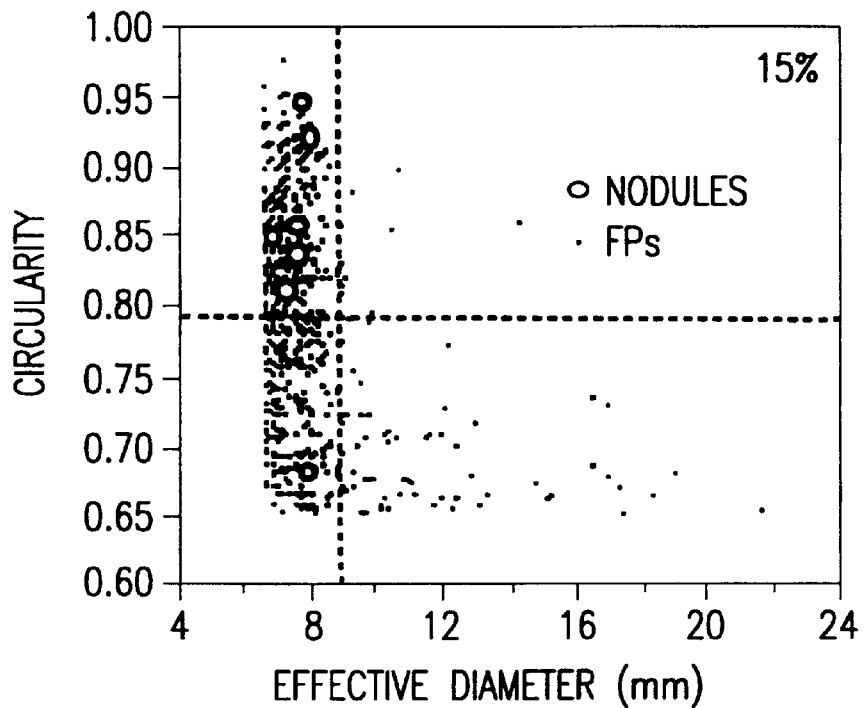
Figure 9F:
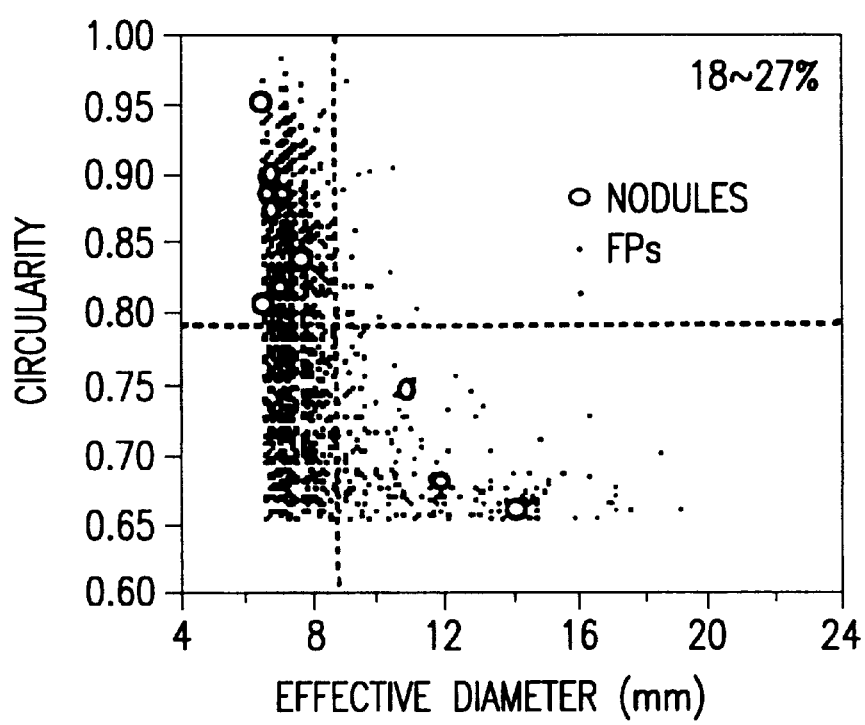

By thresholding the difference image at a series of % threshold levels and setting the pixel values below the corresponding gray-level threshold levels to a constant value, we obtain "island" images (or binary images), as shown in FIG. 7. These islands, at a specific % threshold level, are the remaining patterns of the connected pixels that have pixel values equal to or above the corresponding gray-level threshold level. It should be noted that the size and shape of an islands are changed as the % threshold level changes. Generally, the size increases and the shape deviates from the round pattern as the % threshold level is increased. The size and shape of an island are quantified by measures of the effective diameter (mm), the degree of circularity, and the degree of irregularity, as shown in FIG. 8. The effective diameter is defined as the diameter of a circle having the same area as that of the island. The degree of circularity is expressed as the ratio of the area of the island that lies within the equivalent circle, which is centered at the centroid of the island, to the area of the island. The degree of irregularity is determined by one minus the ratio of the perimeter (circumference) of the equivalent circle to that of the island.

Intuitively, the degree of circularity approaches one if the shape of the island is close to being round. The degree of irregularity will become zero for a round and smooth island. However, the degree of irregularity approaches the maximum value of one when the island contains many large spicules.

Test #1:

An island is considered initially as a nodule candidate if its size and degree of circularity satisfy a specific test, Test #1. The rule of this test is that, for an island to be selected as a nodule candidate, its effective diameter and degree of circularity must be equal to or larger than 6.5 mm and 0.65, respectively, at a given % threshold level. A detected nodule candidate at such a % threshold level will not be examined again at subsequent % threshold levels. The % threshold level at which the nodule candidate is selected will be referred to as the "starting % threshold level" of that nodule candidate. The centroid of the island is treated as the location (in terms of x and y coordinates) of the nodule candidate.

It is important to note that Test #1 is performed only on islands located inside the ribcage edges. Any islands outside the right and left ribcage edges are excluded. These islands could result from devices or bony structures, such as neck bones, shoulder joints, and arms.

The initially detected nodule candidates are then classified in six groups according to their starting % threshold levels, namely, 3%, 6%, 9%, 12%, 15%, and 18–27%. This assortment of nodule candidates is of great importance in the development of our CAD scheme for the detection of lung nodules in chest images. The distributions of the image features of the nodule candidates are closely related to the starting % threshold level, as will be shown in the following discussion, which further explores the significance of this classification process.

D. Differentiation of Nodules from Non-nodules (False Positives) Through Rule-based Tests and Artificial Neural Network (Tests #2–#5)

A very large number of non-nodules (false positives) are included in the initially detected nodule candidates by Test #1. About 60 false positives are selected from each image, on average, after Test #1. Therefore, a series of rule-based tests and an artificial neural network (ANN) are then applied in an effort to reduce the number of false positives detected in each image, while the sensitivity is maintained at a reasonable level. These rule-based tests and ANN are based on a number of image features calculated at the candidate locations from both the original chest image and the difference image. These image features are related to gray level, morphology, or edge gradient.

The gray-level- and morphology-related image features are derived from region growing analysis, whereas the edge-gradient-related image features are obtained by edge gradient analysis. (See D. H. Ballard, et al., Computer vision, Prentice-Hall, Inc., Englewood Cliffs, N.J., 1982; and A. K. Jain, Fundamentals of digital image processing, Prentice-Hall, Inc., Englewood Cliffs, N.J., 1989.) The contrast of a nodule candidate is the gray-level-related image feature. The size and shape of a nodule candidate are quantified by the morphologic image features, i.e., the effective diameter, the degree of circularity, and the degree of irregularity. The variation in the size and shape at a unit change of the contrast reveals the change rates (or slopes) of the morphologic image features of the nodule candidate. The edge-gradient-related image features of a nodule candidate include the average edge gradients and the standard deviation of the distribution of the edge gradient orientation. The edge-gradient-related image features are calculated from the original chest image within a 50×50-pixel ROI centered at the candidate location.

Test #2:

Rule-based Test #2 involves analysis of difference image features derived in Test #1. In rule-based Test #2, the morphologic features, i.e., the effective diameter, the degree of circularity, and the degree of irregularity, which are derived from the difference images in Test #1, are used. FIG. 9 shows the relationships between the effective diameter and the degree of circularity for nodule candidates of different starting % threshold level groups. The circles indicate true nodules and the dots represent false positives (FPs). It should be noted that the distribution of the effective diameter and the degree of circularity of true nodules are related to the starting % threshold level. Both features have a relatively large range in the 3% and 6% groups. However, the ranges of the features for the majority of nodules become much narrower in the higher starting % threshold level groups (groups corresponding to 12%, 15%, and 18–27%). As will be shown in the following discussion, the nodules in the starting % threshold level groups of 3% or 6% either are obvious nodules or have improved conspicuity after application of the difference image approach. On the other hand, the nodules in the higher starting % threshold level groups are still very subtle even after the application of the difference image technique. It is indicated in FIG. 9 that most of the subtle nodules are identified when their size and shape are relatively small and round, respectively.

The dotted lines in FIG. 9 illustrate the predetermined rules for separating the true nodules from the false positives. By this rule-base test, candidates located only in the upper left corner in each diagram are reserved for future examination, and those in the other areas are eliminated as being false positives. It is noted that some subtle nodules in the higher starting % threshold level groups have a low circularity with or without a large size and, therefore, are incorrectly eliminated by this test. These nodules are usually overlapped by several bones, such as the ribs and clavicle, and thus are very subtle. Nevertheless, by application of the adopted rules to each starting % threshold level group, a very large portion of false positives can be removed by this test.

Test #3:

Rule-based Test #3 involves analysis of perihilar nodule candidates. About one of every three false positives after application of Test #2 is located in the perihilar areas of the chest. It is found that the majority of these false positives result from end-on vessels. Because the shadow of an end-on vessel is formed by the x-ray beam incident parallel to the vessel, this type of false positive often appears as a small, round shape with relatively high contrast in the original chest images. For distinguishing these perihilar non-nodules from perihilar nodules, an image feature defined as the grown area (mm$^2$) is calculated in the original chest image for every nodule candidate within the mediastinal region. (See M. L. Giger,et al., "Pulmonary nodules: Computer-aided detection in digital chest image," RadioGraphics 10, 41–51 (1990).) The region growing technique with a fixed gray-level interval is used for deriving the grown area at the candidate location. The initial gray level for the region growing process is chosen as the maximum of a gray-level profile through the candidate. The region growing process is then performed at a series of gray levels reduced in steps of 5 pixel values from the previous one.

FIG. 10(a) illustrates the computer generated grown areas, at a number of gray-level intervals, for a nodule and a false positive (end-on vessel shadow) in the mediastinal region. It is noted in FIG. 10(a) that, as the gray-level interval increases to 20 pixel values, the shape of the grown area of the perihilar nodule appears visually to be close to that of the nodule shadow. However, if the gray-level interval is larger than 20 pixel values, the grown area of the perihilar nodule becomes very irregular, because some background structures around it are included in the grown area. On the other hand, the grown area of the perihilar false positive is very small compared to that of the perihilar nodule at gray-level intervals of 20 pixel values or less. When this difference in the grown area is taken into account, about 80% of false positives due to the end-on vessels in the mediastinal region are eliminated. FIG. 10(b) shows the comparison of the grown areas (derived at the gray-level interval of 20 pixel values) of perihilar nodules and false positives from 50 abnormal and 50 normal images in the database under consideration. It is noted in FIG. 10(b) that the majority of false positives have the grown area less than 40 mm$^2$. Some perihilar false positives, however, have very large grown area (above 300 mm$^2$) because these false positives are resulted from the complicated overlapping of several structures, such as vessels, vertebrae, ribs, and/or cardiac shadow.

Test #4:

Rule-based Test #4 involves analysis of image features in the difference image. In this test, the growth of each candidate, i.e., the island selected from the difference image, is monitored at discrete intervals of the % threshold level. The size and shape of an island change as the % threshold level varies, as shown in FIG. 7. Specifically, the size and the irregularity of an island will increase, while the circularity will decrease, as the % threshold level is increased. It is expected that the growth trend will be different for nodule and non-nodule islands. The initial % threshold level of the growth operation for an island is its starting % threshold level, and the terminating % threshold level is fixed to be the upper 40% of the area under the difference image histogram. The increment of the % threshold level used for the growth operation is 1% of the area under the histogram.

FIGS. 11(a) and 11(b) illustrate the dependence of the effective diameter, the degree of circularity, and the degree of irregularity on the % threshold level for two candidates from the same image; (a) a true nodule and (b) a false positive resulting from the crossing of rib-rib and clavicle in the upper lobe of the right lung close to the apex. The initial % threshold levels are 6% and 3% for the nodule and the false positive, respectively, in FIGS. 11(a) and 11(b). It is noted in FIGS. 11(a) and 11(b) that, at a certain % threshold level, the degree of circularity of an island will consistently be below 0.5. Furthermore, both the effective diameter and the degree of irregularity are increased abruptly at this % threshold level. Intuitively, this abrupt change in the size and shape of an island indicates that the island starts to merge with its surrounding background structures at that % threshold level. A transition point is defined at the % threshold level just before this one. The transition points are at 24% and 9% for the nodule and the false positive, respectively, in FIGS. 11(a) and 11(b).

The number of consecutive % threshold levels between the initial % threshold level and the transition point is defined as an important and useful image feature which is referred to as the run length (RL). The RLs for the nodule and the false positive in FIGS. 11(a) and 11(b) are 19 and 7, respectively. It is found that many false positives tend to have relatively short RLs, especially those originating from bone structures, such as ribs, ribcages or vertebrae. The nodules, on the other hand, usually grow longer before merging into the surrounding background.

The contrast of a nodule candidate is defined as the gray-level interval of the run length. The effective diameter, the degree of circularity, and the degree of irregularity at the transition point are used as morphologic image features which describe the appearance of a nodule candidate.

The ratios of the change in the three morphologic image features over the RL represent the growth rates or rates of change in the size and shape of the nodule candidates. These ratios are referred to as the slopes of the corresponding morphologic image features. Because many false positives have short RLs, they have large growth rates. A comparison of slopes between the nodules and the false positives is shown in FIG. 12. A large number of false positives have RLs less than 6, and thus large slopes. This indicates that these false positives tend to grow very rapidly to merge into the adjacent background structures.

FIG. 13 shows some of the image features in the difference image used in this test for the nodules (marked by circles) and the false positives (FPs, marked by dots). These image features are plotted against the starting % threshold level. It should be noted in FIG. 13 that the distributions of these image features are again closely related to the starting % threshold level. Generally, the nodules in the low starting % threshold level groups (3% or 6%) have a larger size and higher contrast because they are relatively obvious in the difference images. Since the nodules in the high starting % threshold level groups are subtle, it is understandable that their size and contrast are small. It should be noted that all of the nodules in the 18–27% group (the highest starting % threshold level group), except one case, have high degrees of circularity (above 0.8), i.e., the shape of these nodules is very close to circular. This may have two reasons. First, some nodules have high initial % threshold levels, and the islands of these nodules may not merge with their surrounding background because of insufficient growth at the terminating % threshold level of 40%. For these nodules, therefore, the terminating % threshold level of 40% is automatically selected as the "pseudo-transition" point. Second, some nodule islands, even after their full growth, may still have very little contact with their adjacent structures, which are already suppressed by the difference image technique, because of their relatively small size. FIG. 13 suggests that it is useful to employ adaptive cut-off values (rules) to eliminate the false positives in each starting % threshold level group. Examples of the selection of rules for the image features are indicated by the dotted lines in FIG. 13. This method of using the adaptive rule-based test is very effective in removing many of the false positives in each starting % threshold level group. About 70% of the false positives can be excluded by this test.

Test #5:

Rule-based Test #5 involves analysis of image features in the original image. It is difficult to eliminate some false positives, such as those caused by rib-rib crossings or rib-vessel crossings, based only on the analysis of image features derived from the difference images. In the difference images, the main structures of the ribs or vessels are suppressed somewhat, but the crossings are often left as patterns that are much like nodules. Therefore, it is important to analyze the image features derived at the nodule candidate locations in the original chest images, where the localized information around the candidates can be obtained.

The image features used in this test are related to gray level, morphology and edge gradient information. Again, the region growing technique is applied for obtaining the graylevel- and morphology-related image features. It is commonly found that the region growing process is unsuccessful at some candidate locations, especially for candidates located in the peripheral regions close to the ribcages. The main reason for this failure of the region growing process is the great nonuniformity of the background density distribution in these regions. Therefore, it is necessary to remove the nonuniform background around the candidate before applying the region growing process. A two-dimensional background trend correction technique is used for this purpose. (See S. Katsuragawa, et al., "Image feature analysis and computer-aided diagnosis in digital radiography: Detection and characterization of interstitial lung disease in digital chest radiographs," Med. Phys. 15, 311–319 (1988).) For every nodule candidate which had passed all previous tests, a 50×50-pixel ROI is selected at the center of the candidate. The background trend of the ROI is estimated by fitting a two-dimensional surface with a third-order polynomial function to the gradual change of the density distribution in the ROI. The background surface is then subtracted from the pixel values in the ROI.

To conduct the region growing process for a candidate, (See T. Matsumota, et al., "Image feature analysis of false-positive diagnoses produced by automated detection of lung nodules," Invest. Radiol. 27, 587–597 (1992)) the initial pixel value is chosen as the maximum of the pixel values within a smaller 10×10-pixel ROI centered at the candidate location. The region growing process is then performed at various gray levels, with an increment of 3 pixel values. At each gray level, the grown area of the candidate is quantified by the morphologic image features, i.e., the effective diameter, the degree of circularity, and the degree of irregularity. The definitions of these morphologic image features for the grown area of a candidate are basically the same as those for an island (i.e., the nodule candidate in the difference image). The contrast of the grown region at each gray level is determined as the gray-level interval that yielded the grown region.

FIG. 14 shows the relationships between the contrast and the three morphologic image features of the grown region for an actual nodule. By comparison with FIG. 11, it is noted that there is a similar transition point during the region growing process. The transition point occurs at a contrast of about 45 pixel values in FIG. 14. Immediately after the transition point, the effective diameter and the degree of irregularity of the grown region increase abruptly, and the degree of circularity decreases sharply. The presence of this transition point indicates, once again, that the grown region of a nodule candidate has merged with its surrounding background. The grown region of a true nodule at the transition point usually appears similar visually to the actual size and shape of the nodule. The contrast and the three morphologic image features derived at the transition point are used in this test. Besides these image features, the net contrast of a nodule candidate is defined as the difference between the contrast and the average gray level of the background region, which is defined here as a round area that has a diameter of two times the effective diameter of the grown region of the nodule candidate.

As the contrast increases from zero to its value at the transition point, the nodule candidate grows from its starting point to approximately its full size. For assessment of the growth rate, the slopes of the three morphologic image features are calculated, at the transition point, as the ratios of the changes in the corresponding image features to the contrast.

Besides using the image features defined above, in this test we use two additional edge-gradient-related image features. For each nodule candidate, the magnitude and the orientation of edge gradients are calculated for pixels within a 50×50-pixel ROI centered at the candidate location. Two image features obtained from the edge gradient analysis are the average edge gradients and the standard deviation of the distribution of edge gradient orientations. For an ROI that contains a nodule and vessels, the edge gradients will be oriented in all directions, and thus a small standard deviation may result from the distribution of gradient orientations. On the other hand, if an ROI contains rib edges, the gradient orientation distribution will show a definite directionality and yield a larger standard deviation.

The distributions of some of the image features extracted from the original image and used in this test are shown in FIG. 15. The nodule candidates (nodules are indicated by circles and false positives by dots) plotted here are obtained from the 100 abnormal cases and have passed all previous rule-based tests. It is evident in FIG. 15 that these distributions are also related to the starting % threshold level. Recall that the starting % threshold level of a nodule candidate is the % threshold level at which the corresponding island is identified as a nodule candidate in Test #1. The effective diameter and contrast are relatively large for nodule candidates in the low starting % threshold level groups. However, the circularities for nodules in the highest starting % threshold level group (18–27%) are, in general, notably higher. Therefore, the cutoff values (rules) that are used for elimination of false positives for this test must be adapted to the different starting % threshold level groups, as indicated by the dotted lines in FIG. 15. A nodule candidate will be deleted from the candidate list if it does not satisfy any one of these rules. A candidate, however, that has passed all of these rule-based tests will be examined further by an artificial neural network, as will be discussed in the next section.

Artificial Neural Network (ANN) Test:

For further reduction of the number of false positives that will be reported by the computer, an artificial neural network (ANN) is trained to identify the false positives among all nodule candidates that have passed all of the rule-based tests described above. An artificial neural network is a non-algorithmic approach to information processing which develops feature recognition capabilities by learning from examples presented repeatedly, rather than using rule-based criteria. ANN's have some unique attributes: universal approximation (input-output mapping), the ability to learn from and adapt to their environment, and tolerance of noise within the input data.

In the present invention, a back-propagation ANN is used as the final step of the CAD method for the automated detection of lung nodules in chest images. This ANN has three layers and is based on the supervised error-correction learning rule. (See S. Haykin, Neural Networks. A Comprehensive Foundation, Macmillan College Publishing Company, 1994; and J. M. Boone, et al., "Neural networks in radiologic diagnosis," Invest. Radiol. 25, 1012–1016 (1990).) The structure of the ANN is shown in FIG. 16. The input layer has 11 nodes, which include ten image features from the original chest image, namely, the effective diameter, degrees of circularity and irregularity, slopes of the effective diameter and degrees of circularity and irregularity, average gradient, standard deviation of gradient orientation, contrast and net contrast, and the starting % threshold level in Test #1. The 11 inputs (image features) are normalized to a range from 0 to 1 before use by the ANN for the training or testing process. The output layer has only one node, which produces a value between 0 and 1. For a nodule candidate (characterized by its 11 image features) presented to the input layer of the ANN, the value from the output node of the ANN indicates the likelihood that this nodule candidate is a true nodule or a false positive, with values of 1 and 0 corresponding to a nodule and a false positive, respectively. In other words, the determination that a nodule candidate is to be considered either a true nodule or a false positive by the ANN will depend on the cutoff value (or threshold value) used. To assess objectively the ANN's overall performance in the differentiation of nodules from false positives, the invention uses the receiver operating characteristic (ROC) curve. (See D. J. Goodenough, et al., "Radiographic applications of receiver operating characteristic (ROC) curves," Radiology 110, 89–95 (1974); and C. E. Metz, "ROC methodology in radiologic imaging," Invest. Radiol. 21, 720–733 (1986).) In ROC analysis, one obtains a curve that relates the true-positive fraction (TPF) to the false-positive fraction (FPF) by varying the threshold value.

After training, the performance of the ANN was evaluated by use of a testing set, the cases which were not included in the training set. By comparison of the ANN output with the corresponding truth of all nodules and false positives in the testing set, the ROC curve of the trained ANN is obtained. The $A_z$ value, which is the area under the ROC curve, is then used as the index for assessing the overall performance of the trained ANN. (See J. A. Hanley et al., "The meaning and use of the area under a receiver operating characteristic (ROC) curve," Radiology 143, 29–36 (1982); and C. E. Metz, "Some practical issues of experimental design and data analysis in radiological ROC studies," Invest. Radiol. 24, 234–245 (1989).) If the training is successful, the trained ANN will be able to provide many correct responses for inputs from the testing set, and thus give a high $A_z$ value.

Evaluation of Results:

To perform an objective evaluation of computerized methods, the free-response receiver operating characteristic (FROC) methodology (See D. P. Chakraboty, "Maximum likelihood analysis of free-response receiver operating characteristic (FROC) data," Med. Phys. 16 (1989); and D. P. Chakrabotyet et al., "Free-response methodology: Alternate analysis and a new observer-performance experiments Radiology 174, 873–881 (1990)) is employed to describe the overall performances of the computerized schemes for the detection of lung nodules in chest images. Here, the performance is expressed in terms of the sensitivity (true positive detection rate) and the mean number of false positives per image. The FROC curve can provide a complete assessment of the relationship between the performance and the decision cutoff values (i.e., the rules used in the rule-based tests, or the threshold values in the ANN). In order to evaluate the present computerized method objectively, the database was divided into a pair of training and testing sets by using the jackknife method. (See Y. C. Wu, et al., "Reduction of false positives in computerized detection of lung nodules in chest radiographs using artificial neural networks, discriminant analysis and a rule-based scheme," J. of Digital Image 7, 196–207 (1994).) The computerized method used the training set to establish the rules of the rule-based tests and also the connection weights of the ANN. The trained scheme was then applied to the testing set. By the jackknife method, the training set was comprised of 50 abnormal and 50 normal chest images that were randomly selected from our database. The remaining 50 abnormal and 50 normal images were used as the testing set. By repeating the above procedure, a total of 10 pairs of training and testing sets were created. The average FROC curve obtained from 10 testing sets at each operating point was used to represent the overall performance of our computerized scheme for the detection of lung nodules in chest images.

RESULTS:

For Test #1, the criteria for selection of an island as a nodule candidate were that the effective diameter and the degree of circularity of the island must be equal to or larger than 6.5 mm and 0.65, respectively. These initial criteria were selected empirically, since the matched filter used in the difference image technique can effectively enhance a nodule type pattern as small as 6 mm in diameter. The sensitivity and the false positive rate with these criteria were about 94% and 60/image, respectively. FIG. 17 is the FROC curve resulting from varying the rule on the effective diameter, and the figure shows that, if the effective diameter is reduced from 6.5 mm to 3.5 mm, the false positive rate is increased by more than 50%, while the sensitivity is increased by less than 4%. However, if the effective diameter is increased, for example, to 8 or 10 mm, the sensitivity is reduced substantially. The overall performance of the CAD scheme could deteriorate in both situations because of either a large false positive rate or a low sensitivity.

The different cutoff values (rules) in Test #2 were applied at each starting % threshold level group, as shown in FIG. 9. It should be noted that these rules are related to the criteria used in Test #1. About half of the false positives were deleted from the nodule candidate list by this second test. The false positive rate was reduced from about 60 per image to about 33 per image.

A nodule candidate was examined by Test #3 if it survived Test #2 and also was located in the mediastinal region of the chest image. In the database employed, there was a much smaller number of nodules than that of false positives in the perihilar regions. There were approximately 5 nodules, compared with more than one thousand false positives in each training or testing set. Therefore, it was straightforward to predetermine the cutoff values (the rules) for Test #3, as shown by the dashed lines in FIG. 10(b). The predetermined cutoff values, i.e., the upper and lower limits, were 300 and 40 mm$^2$, respectively, for the grown area in this test. A nodule candidate was eliminated from the candidate list if its grown area was outside the preselected limits. Almost about 80% of the false positives, mainly due to end-on vessels, could be removed by this test. Note that the preselected rule was useful only for the current database, which included a very limited number of perihilar nodules. This rule might have to be changed if there are more perihilar nodules in the database.

In Tests #4 and #5, the rules for eliminating false positives in each starting % threshold level group were determined in the training process. First, the set of training images was examined by the computerized scheme. For each image feature, the minimum and maximum values for all true nodules in each starting % threshold level group were selected as the lower and upper limits for the corresponding rule-based test. The rules thus derived on each image feature were then applied to the images in the testing set. A nodule candidate in the testing set can survive these tests if its image features are within the limits of the corresponding tests.

Finally, the nodule candidates that had satisfied all of the rule-based tests were examined by the ANN. FIG. 18 illustrates the variation of the $A_z$ with the number of iterations for the ANN used in our CAD scheme. The curve in FIG. 18 is the average of ten testing sets at each iteration. It is noted in FIG. 18 that the $A_z$ increases initially as the number of iterations increases. The $A_z$ reaches its maximum at about 6,000 iterations and then decreases slightly, probably because of over-training of the ANN. For our current database, the ANN achieved a maximum average $A_z$ value of 0.75 with the ANN structure, which included 9 hidden nodes, for a learning rate coefficient and a momentum of 0.001 and 0.95, respectively. FIG. 19 is the average ROC curve (averaged over the parameters of the slope and intercept of each individual ROC curve) of the trained ANN with an average $A_z$ value of 0.75.

FIG. 20 shows the FROC curves obtained with the rule-based test only and with the combination of the rule-based tests and the ANN. The FROC curve of the combination scheme was obtained by varying the threshold value of the output layer of the ANN. The two FROC curves obtained with the rule-based test only, in FIG. 20, were derived by a change in the rules on the RL in Test #4 and the degree of circularity in Test #5. Either the RL or the circularity was the most effective image feature in Test #4 or Test #5, respectively, as will be discussed later in detail. Increasing the criterion for either the minimum RL or the minimum circularity in Test #4 or Test #5, respectively, could cause a reduction in both the sensitivity and the false positive rate. There was no substantial difference between these two FROC curves when the sensitivity was above 50%. It is important to note in FIG. 20 that, at a sensitivity range above 50%, the combination method performs better in terms of the sensitivity and false positive rate than does the rule-based-test-only method. This superior performance is due to the fact that the ANN can further separate some confusing false positives from true nodules after a series of rule-based tests which have already eliminated many of the relatively easily recognizable false positives. At the sensitivity level of about 70%, method (i.e., the combination method-rule-based+ANN) produced 1.7 false positives per chest image, on average, as indicated in FIG. 20. This average false positive rate is considerably lower than that reported in previous studies.

FIG. 21 shows an example of the performance of the CAD scheme applied to chest images for the automated detection of lung nodules. The original chest image, on the left, has an extremely subtle nodule (rating score of 1) in the middle lobe of the right lung. This nodule indicates a primary lung cancer, which was confirmed by CT scans. For this case, the CAD method of the present invention correctly indicates the nodule location (arrow) with only one false positive, as shown in FIG. 21(b). The false positive is due to the crossing of a posterior rib, vertebral bone, and vessel.

"FIG. 22 is an illustration of a general purpose computer programmed to perform the method according to the invention, and a storage medium storing a program to perform the method according to the invention. In FIG. 22, the computer 900 implements the method according to the present invention, wherein the computer includes, for example, a display device 902, a keyboard 904, a pointing device 906, a mouse pad 908, a hard disk 910, or other fixed, high density media drives, connected using an appropriate device bus, a floppy drive 912, or other removable media devices known in the art, and electronic memory (not shown).

As stated above, the system includes at least one computer readable medium. Such computer readable media further includes the storage medium of the present invention for performing any of the processes according to the present invention, described above.

Accordingly, the mechanisms and processes set forth in the present description may be implemented using a conventional general purpose microprocessor or computer programmed according to the teachings in the present specification, as will be appreciated by those skilled in the relevant art(s). Appropriate software coding can readily be prepared by skilled programmers based on the teachings of the present disclosure, as will also be apparent to those skilled in the relevant art(s)."

DISCUSSION:

An important step is to separate nodule candidates based on their starting % threshold levels, at which the nodule candidates are selected by multiple gray-level thresholding (Test #1). A total of six groups that were associated with the starting % threshold levels of 3%, 6%, 9%, 12%, 15%, and 18–27% were identified. Intuitively, this classification process divides nodule candidates into different groups based on their conspicuity in the difference images. To understand this, for the 122 nodules in the database, the inventors examined the correlation between the average subtlety of the nodules rated from the original chest images, and their starting % threshold levels derived from Test #1, as shown in the following Table 1.

TABLE 1

| Starting % threshold level | Subjective subtlety | | | | |
|---|---|---|---|---|---|
| | 1 extremely subtle | 2 very subtle | 3 subtle | 4 relatively obvious | 5 obvious |
| 3% | 6 | 3 | 11 | 8 | 3 |
| 6% | 6 | 4 | 5 | 8 | 1 |
| 9% | 8 | 6 | 8 | 4 | 0 |
| 12% | 5 | 6 | 4 | 0 | 0 |
| 15% | 5 | 1 | 1 | 0 | 0 |
| 18~27% | 3 | 2 | 4 | 3 | 0 |
| Total Number | 33 | 22 | 33 | 23 | 4 |

The numbers in Table 1 are the numbers of nodules with different subjective subtlety ratings which were identified at various starting % threshold levels. Only 115 nodules are listed in Table 1 because the other seven nodules cannot be identified in Test #1 with the current criteria. Most of the obvious nodules (subtlety rating score 5 or 4) have starting % threshold levels of 3%, 6%, and 9%. Specifically, 20 of 27 of these obvious nodules are classified in the starting % threshold level groups of 3% or 6%. These obvious nodules generally are of higher contrast in optical density or of larger diameter, or there may be less overlap with the nearby normal anatomic background structures in the original chest images. The appearance of these obvious nodules is enhanced further by the difference image technique.

It should be noted in Table 1 that about 40% of the subtle nodules, with subtlety rating scores from 1 to 3, are also ranked within the low starting % threshold level groups (i.e., 3% or 6%). It was found, however, that the conspicuity of these subtle nodules which were ranked in the low starting % threshold level groups was clearly improved by suppression of the normal background structures near the nodules by use of the difference image technique. Therefore, these nodules appeared to be quite prominent in the difference images. For the remaining subtle nodules which were classified in the higher starting % threshold level groups (i.e., 12% to 18–27%), on the other hand, their conspicuity was generally not improved in the difference images. These remaining subtle nodules either were very small or had low contrast because of insufficient suppression of normal background structures.

Since the distributions of image features of nodule candidates are closely related to the starting % threshold level groups, the adaptive rule-based tests are very effective for eliminating false positives in each group. For a given image feature, the ability to differentiate between nodules and false positives can be examined by its $A_z$ value obtained from ROC analysis. An image feature with a higher $A_z$ value implies that the image feature is more effective in the elimination of false positives, if the image feature is used alone. The following Tables 2 and 3 show the $A_z$ values for image features used in Tests #4 and #5.

TABLE 2

| Starting % threshold level | RL | Contrast | Diameter | Circularity | Irregularity | Slope of diameter | Slope of circularity | Slope of irregularity |
|---|---|---|---|---|---|---|---|---|
| 3% | 0.80 | 0.74 | 0.71 | 0.62 | 0.57 | 0.75 | 0.61 | 0.66 |
| 6% | 0.79 | 0.76 | 0.70 | 0.51 | 0.49 | 0.68 | 0.55 | 0.63 |
| 9% | 0.71 | 0.70 | 0.53 | 0.62 | 0.62 | 0.73 | 0.60 | 0.64 |
| 12% | 0.70 | 0.68 | 0.65 | 0.57 | 0.61 | 0.57 | 0.59 | 0.65 |
| 15% | 0.63 | 0.54 | 0.41 | 0.71 | ** | ** | 0.63 | 0.73 |
| 18–27% | 0.64 | 0.56 | 0.50 | 0.70 | 0.68 | 0.67 | ** | ** |
| Without grouping | 0.76 | 0.75 | 0.65 | 0.57 | 0.56 | 0.61 | 0.59 | 0.59 |

** Az value not available due to divergence of ROC fitting

TABLE 3

| Starting % threshold level | Contrast | Net contrast | Diameter | Circularity | Irregularity | Slope of diameter | Slope of circularity | Slope of irregularity | Average gradient | SD gradient orientation |
|---|---|---|---|---|---|---|---|---|---|---|
| 3% | 0.58 | 0.64 | 0.49 | 0.66 | 0.51 | 0.50 | 0.64 | 0.64 | 0.62 | 0.43 |
| 6% | 0.49 | 0.64 | 0.56 | 0.65 | 0.48 | 0.48 | 0.53 | 0.52 | 0.55 | 0.54 |
| 9% | 0.57 | 0.54 | 0.42 | 0.66 | 0.56 | 0.40 | 0.55 | 0.51 | 0.66 | 0.60 |
| 12% | 0.69 | 0.73 | 0.55 | 0.68 | 0.54 | 0.63 | 0.43 | 0.43 | 0.75 | 0.51 |
| 15% | 0.63 | 0.69 | 0.66 | 0.71 | 0.70 | 0.68 | 0.39 | 0.54 | 0.65 | 0.46 |
| 18–27% | 0.55 | 0.64 | 0.54 | 0.86 | 0.72 | 0.40 | 0.45 | 0.60 | 0.56 | 0.55 |
| Without grouping | 0.49 | 0.57 | 0.56 | 0.69 | 0.58 | 0.46 | 0.50 | 0.54 | 0.56 | 0.53 |

For each image feature, the $A_z$ value was calculated for each starting % threshold level group as well as without grouping. The RL in Table 2 and the degree of circularity in Table 3 provided the highest $A_z$ values in Tests #4 and Test #5, respectively. It is noted in Tables 2 and 3 that, for most image features, the $A_z$ value could be improved in some of the starting % threshold level groups. As an example, the $A_z$ value of the degree of circularity in Table 3 is increased to 0.86 for the highest starting % threshold level group. However, the $A_z$ value is only 0.69 without the assortment process. It is important to note in Tables 2 and 3 that some of the various image features have improved $A_z$ values in some of the different starting % threshold level groups. For example, in Table 2, the RL, contrast, and effective diameter have relatively higher $A_z$ values in the lower starting % threshold level groups, while the degree of circularity has higher $A_z$ values in the higher starting % threshold level groups. Inasmuch as the rule-based tests are performed sequentially, the overall effectiveness in the elimination of false positives can be improved greatly with the grouping of nodule candidates, as demonstrated in this study.

The causes of the false positives remaining after the different tests in the CAD method of the present invention are shown in the following Table 4.

TABLE 4

| Causes of false positives (FPs) | After Test #4 # of FPs | After Test #5 # of FPs | After ANN # of FPs |
|---|---|---|---|
| rib-rib crossings | 150(31.3%) | 61(29.3%) | 46(32.4%) |
| rib-other bone crossings | 85(17.7%) | 41(19.7%) | 30(21.1%) |

TABLE 4-continued

| Causes of false positives (FPs) | After Test #4 # of FPs | After Test #5 # of FPs | After ANN # of FPs |
|---|---|---|---|
| rib-vessel crossings | 130(27.1%) | 51(24.5%) | 24(16.9%) |
| rib-soft tissue interaction | 37(7.7%) | 25(12.0%) | 21(14.8%) |
| vessel aggregate (vessel-vessel crossings) | 26(5.4%) | 8(3.8%) | 6(4.2%) |
| end-on vessel | 30(6.3%) | 13(6.3%) | 10(7.0%) |
| soft tissue-soft tissue interaction | 8(1.7%) | 5(2.4%) | 4(2.8%) |
| devices | 14(2.9%) | 4(1.9%) | 1(0.7%) |
| Total | 480 (100%) | 208 (100%) | 142 (100%) |

The inventors randomly selected 70 images (35 abnormal and 35 normal) from their database (including 200 images, 100 abnormal and 100 normal) for this analysis. A total of eight types of false positives were identified based on visual judgment by a radiologist, as listed in Table 4. It is noted in Table 4 that the false positives resulted from the ribs, such as crossings of the rib-rib, rib-other bones (i.e., clavicle or vertebra), rib-vessel, and rib-soft tissue are counted up over 80% of the remaining false positives after Test #4, Test #5, and the ANN. Therefore, it will be desirable to develop techniques for recognizing and quantifying the rib-related effects in order to reduce the false positive rate further and thus further to improve the overall performance of the CAD scheme for automated detection of lung nodules in chest images.

The CAD method of the present invention has an improved overall performance, in terms of the sensitivity and false positive rate, when the rule-based tests are combined with the ANN. At the sensitivity level of 70%, the false positive rate is about 1.7 per image, which is considerably lower than in previous studies. The CPU time for processing of one chest image is about 20 seconds on an IBM RISC/6000 Powerstation 590.

Obviously, numerous modifications and variations of the present invention are possible in light of the above teachings. It is therefore to be understood that within the scope of the appended claims, the invention may be practiced otherwise than as specifically described herein.

What is claimed is:

1. A computer-aided diagnosis method for detecting lung nodules in a digitized original chest image, comprising:
    a) deriving signal-enhanced and signal-suppressed versions of said original chest image and determining the difference therebetween to produce a difference image;
    b) grey-level thresholding the difference image at plural predetermined gray-level % threshold levels and, at each % threshold level, subjecting those pixels having values greater than respective % threshold level to predetermined morphological tests to identify candidate nodules;
    c) subjecting the candidate nodules to predetermined rule-based tests based on predetermined image features applied to the corresponding locations in the difference image and in the original image to eliminate from the candidate nodules false-positive nodules, at least one of said tests having rules which vary with respective ones of said % threshold levels; and
    d) subjecting the candidate nodules remaining after step c) to a trained artificial neural network (ANN) to eliminate further false positive candidate nodules and identify remaining candidate nodules as true positive nodule candidates.

2. The method of claim 1, wherein said step b) comprises:
    setting pixel values of pixels having values below predetermined gray-level % thresholds to a constant value for each of said predetermined gray-level % thresholds to obtain islands at each gray-level % threshold; and
    identifying said candidate nodules on the basis of the size and shape of the islands.

3. The method of claim 1, wherein said step c) comprises:
    performing predetermined rule-based tests based on image features selected from the group consisting of gray level, morphologic, and edge gradient image features calculated at locations of candidate nodules remaining after step b) and after each test of said rule-based tests.

4. The method of claim 2, wherein said step c) comprises:
    performing predetermined rule-based tests based on image features selected from the group consisting of gray level, morphologic, and edge gradient image features calculated at locations of candidate nodules remaining after step b) and after each test of said rule-based tests.

5. The method of claim 3, wherein said step c) further comprises:
    performing region growing in the original chest image at fixed gray-level intervals for each candidate nodule to derive grown areas at each location corresponding to a candidate nodule in a mediastinal region of the original chest image; and
    eliminating as candidate nodules those candidate nodules which correspond to grown areas below a predetermined lower limit or above a predetermined upper limit.

6. The method of claim 4, wherein said step c) further comprises:
    performing region growing in the original chest image at fixed gray-level intervals for each candidate nodule to derive grown areas at each location corresponding to a candidate nodule in a mediastinal region of the original chest image; and
    eliminating as candidate nodules those candidate nodules which correspond to grown areas below a predetermined lower limit or above a predetermined upper limit.

7. The method of claim 3, wherein said step c) further comprises:
    identifying gray-level % threshold levels at discrete intervals in an upper portion of a gray-level histogram of the difference image;
    setting pixel values of each pixel in the difference image having a value below said % threshold levels, for each % threshold level, to a constant value to produce island regions, at each % threshold level, formed by pixels having values above each said % threshold level;
    determining for each island region produced in the preceding step, at each % threshold level, image features selected from the group consisting of contrast, effective diameter, degree of circularity, degree of irregularity, slope of diameter, slope of circularity, slope of irregularity, and run length;
    determining a transition point in a selected image feature determined in the preceding determining step as a function of said % threshold levels; and
    eliminating as candidate nodules those candidate nodules which exhibit transition points of said image features at a % threshold level below a predetermined lower limit or above a predetermined upper limit.

8. The method of claim 7, wherein said step c) further comprises:
    determining a run length in terms of the number of consecutive % threshold levels between an initial % threshold level and the transition point determined for each candidate nodule; and
    eliminating as candidate nodules those candidate nodules having run length below a predetermined lower limit or above a predetermined upper limit.

9. The method of claim 8, wherein said step c) further comprises:
    determining the change in said image features over the respective run lengths determined in the preceding step to derive rates of change in said image features of the candidate nodules; and
    eliminating as candidate nodules those candidate nodules exhibiting rates of change in said image features below a predetermined lower limit or above a predetermined upper limit.

10. The method of claim 9, wherein said step c) further comprises:
    determining the contrast, diameter, degree of circularity, degree of irregularity, slope of diameter, slope of circularity, and slope of irregularity of each said island region in the difference image at each % threshold level; and
    eliminating as candidate nodules those candidate nodules determined in the preceding step to have predetermined contrast, diameter, degree of circularity, degree of irregularity, slope of diameter, slope of circularity, and slope of irregularity values.

11. The method of claim 10, wherein said step c) further comprises:

performing a two-dimensional background trend correction in a region of interest of predetermined size centered on the location of each candidate nodule in the original chest image;

performing region growing within a portion of the region of interest centered on the location of each candidate nodule in the original chest image at predetermined discrete gray-level increments;

quantifying predetermined image features selected from the group consisting of contrast, effective diameter, degree of circularity, degree of irregularity, net contrast, slope of diameter, slope of circularity, slope of irregularity, average gradient, standard deviation of edge gradient orientation histogram at each said gray-level increment for each grown region;

determining a transition point at which the effective diameter abruptly increases;

eliminating as candidate nodules those candidate nodules exhibiting a predetermined contrast, effective diameter, degree of circularity, degree of irregularity, net contrast at the transition point; and eliminating as candidate nodules those candidate nodules having a slope of diameter, slope of circularity, slope of irregularity, average gradient, and standard deviation of edge gradient histogram below a predetermined lower limit or above a predetermined upper limit.

12. The method of claim 4, wherein said step c) further comprises:

identifying gray-level % threshold levels at discrete intervals in an upper portion of a gray-level histogram of the difference image;

setting pixel values of each pixel in the difference image having a value below said % threshold levels, for each % threshold level, to a constant value to produce island regions, at each % threshold level, formed by pixels having values above each said % threshold level;

determining for each island region produced in the preceding step, at each % threshold level, image features selected from the group consisting of contrast, effective diameter, degree of circularity, degree of irregularity, slope of diameter, slope of circularity, slope of irregularity, and run length;

determining a transition point in a selected image feature determined in the preceding determining step as a function of said % threshold levels; and eliminating as candidate nodules those candidate nodules which exhibit transition points of said image features at a % threshold level below a predetermined lower limit or above a predetermined upper limit.

13. The method of claim 12, wherein said step c) further comprises:

determining a run length in terms of the number of consecutive % threshold levels between an initial % threshold level and the transition point determined for each candidate nodule; and eliminating as candidate nodules those candidate nodules having run length below a predetermined lower limit or above a predetermined upper limit.

14. The method of claim 13, wherein said step c) further comprises:

determining the change in said image features over the respective run lengths determined in the preceding step to derive rates of change in said image features of the candidate nodules; and eliminating as candidate nodules those candidate nodules exhibiting rates of change in said image features below a predetermined lower limit or above a predetermined upper limit.

15. The method of claim 14, wherein said step c) further comprises:

determining the contrast, diameter, degree of circularity, degree of irregularity, slope of diameter, slope of circularity, and slope of irregularity of each said island region in the difference image at each % threshold level; and eliminating as candidate nodules those candidate nodules determined in the preceding step to have predetermined contrast, diameter, degree of circularity, degree of irregularity, slope of diameter, slope of circularity, and slope of irregularity values.

16. The method of claim 15, wherein said step c) further comprises:

performing a two-dimensional background trend correction in a region of interest of predetermined size centered on the location of each candidate nodule in the original chest image;

performing region growing within a portion of the region of interest centered on the location of each candidate nodule in the original chest image at predetermined discrete gray-level increments;

quantifying predetermined image features selected from the group consisting of contrast, effective diameter, degree of circularity, degree of irregularity, net contrast, slope of diameter, slope of circularity, slope of irregularity, average gradient, standard deviation of edge gradient orientation histogram at each said gray-level increment for each grown region;

determining a transition point at which the effective diameter abruptly increases;

eliminating as candidate nodules those candidate nodules exhibiting a predetermined contrast, effective diameter, degree of circularity, degree of irregularity, net contrast at the transition point; and eliminating as candidate nodules those candidate nodules having a slope of diameter, slope of circularity, slope of irregularity, average gradient, and standard deviation of edge gradient histogram below a predetermined lower limit or above a predetermined upper limit.

17. The method of claim 1, wherein said step d) comprises:

using a three layer back propagation ANN based on a supervised error-correction learning rule; and applying to an input layer of said ANN input data based on image features including one or more image features derived from locations, in the original chest image, of candidate nodules surviving after performing step c), said one or more image features including effective diameter, degree of circularity, degree of irregularity, slope of the effective diameter, slope of degree of circularity, slope of degree of irregularity, average gradient, standard deviation of gradient orientation, contrast, net contrast, and a starting gray-level % threshold.

18. The method of claim 17, wherein said step d) further comprises:

normalizing each image feature applied to said input layer to a range from 0 to 1 and applying the normalized image features to said input layer as said input data.

19. A computer programmed to perform the method recited in claim 1.

20. A computer programmed to perform the method recited in claim 2.

21. A computer programmed to perform the method recited in claim 3.

22. A computer programmed to perform the method recited in claim 4.

23. A computer programmed to perform the method recited in claim 5.

24. A computer programmed to perform the method recited in claim 6.

25. A computer programmed to perform the method recited in claim 7.

26. A computer programmed to perform the method recited in claim 8.

27. A computer programmed to perform the method recited in claim 9.

28. A computer programmed to perform the method recited in claim 10.

29. A computer programmed to perform the method recited in claim 11.

30. A computer programmed to perform the method recited in claim 12.

31. A computer programmed to perform the method recited in claim 13.

32. A computer programmed to perform the method recited in claim 14.

33. A computer programmed to perform the method recited in claim 15.

34. A computer programmed to perform the method recited in claim 16.

35. A computer programmed to perform the method recited in claim 17.

36. A computer programmed to perform the method recited in claim 18.

37. A storage medium storing a program to perform the method recited in claim 1.

38. A storage medium storing a program to perform the method recited in claim 2.

39. A storage medium storing a program to perform the method recited in claim 3.

40. A storage medium storing a program to perform the method recited in claim 4.

41. A storage medium storing a program to perform the method recited in claim 5.

42. A storage medium storing a program to perform the method recited in claim 6.

43. A storage medium storing a program to perform the method recited in claim 7.

44. A storage medium storing a program to perform the method recited in claim 8.

45. A storage medium storing a program to perform the method recited in claim 9.

46. A storage medium storing a program to perform the method recited in claim 10.

47. A storage medium storing a program to perform the method recited in claim 11.

48. A storage medium storing a program to perform the method recited in claim 12.

49. A storage medium storing a program to perform the method recited in claim 13.

50. A storage medium storing a program to perform the method recited in claim 14.

51. A storage medium storing a program to perform the method recited in claim 15.

52. A storage medium storing a program to perform the method recited in claim 16.

53. A storage medium storing a program to perform the method recited in claim 17.

54. A storage medium storing a program to perform the method recited in claim 18.

* * * * *